(12) United States Patent
Lee et al.

(10) Patent No.: US 10,177,818 B2
(45) Date of Patent: Jan. 8, 2019

(54) METHOD AND DEVICE FOR WIRELESSLY TRANSMITTING POWER

(71) Applicant: Samsung Electronics Co., Ltd., Suwon-si, Gyeonggi-do (KR)

(72) Inventors: Sang-Wook Lee, Suwon-si (KR); Jae-Hyuck Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/472,795

(22) Filed: Mar. 29, 2017

(65) Prior Publication Data

US 2017/0288737 A1    Oct. 5, 2017

Related U.S. Application Data

(60) Provisional application No. 62/315,869, filed on Mar. 31, 2016.

(30) Foreign Application Priority Data

Oct. 10, 2016  (KR) .................. 10-2016-0130790
Jan. 3, 2017   (KR) .................. 10-2017-0000732

(51) Int. Cl.
*H04B 5/00* (2006.01)
*H02J 50/80* (2016.01)
(Continued)

(52) U.S. Cl.
CPC .......... *H04B 5/0037* (2013.01); *G06Q 20/322* (2013.01); *G06Q 20/34* (2013.01);
(Continued)

(58) Field of Classification Search
CPC .. H04B 5/0037; H04B 1/3883; H04B 5/0031; H04W 4/008; G06Q 20/34;
(Continued)

(56) References Cited

U.S. PATENT DOCUMENTS

2011/0115432 A1   5/2011   El-Maleh et al.
2012/0109403 A1   5/2012   Shelton et al.
(Continued)

FOREIGN PATENT DOCUMENTS

KR   10-2012-0093356 A   8/2012
KR   10-1420366 B1       7/2014
(Continued)

OTHER PUBLICATIONS

European Search Report dated Nov. 22, 2018, issued in European Patent Application No. 17775823.2.

*Primary Examiner* — Andrew Wendell
(74) *Attorney, Agent, or Firm* — Jefferson IP Law, LLP

(57) ABSTRACT

Provided is a device for transmitting wireless power. The wireless power transmitting device includes a communication unit, a power receiving unit, and a processor. The processor is configured to obtain, through the communication unit, communication establishment information and location information associated with a wireless charging area from a tag device, establish, through the communication unit, communication with a wireless power transmitting device based on the communication establishment information, and control to transmit the location information to the wireless power transmitting device. The power receiving unit wirelessly receives the power from the wireless power transmitting device after the communication unit transmits the location information.

20 Claims, 12 Drawing Sheets

(51) Int. Cl.
  *H02J 50/12* (2016.01)
  *H02J 50/40* (2016.01)
  *G06Q 20/32* (2012.01)
  *G06Q 20/34* (2012.01)
  *H02J 7/02* (2016.01)
(52) U.S. Cl.
  CPC .............. *H02J 7/025* (2013.01); *H02J 50/12* (2016.02); *H02J 50/40* (2016.02); *H02J 50/80* (2016.02); *H04B 5/0031* (2013.01)
(58) Field of Classification Search
  CPC ........ G06Q 20/322; H02J 50/40; H02J 7/025; H02J 50/12; H02J 50/80
  See application file for complete search history.

(56) References Cited

U.S. PATENT DOCUMENTS

| | | | |
|---|---|---|---|
| 2013/0241474 A1* | 9/2013 | Moshfeghi | H02J 7/0027 320/108 |
| 2013/0288595 A1* | 10/2013 | Lee | H01F 38/14 455/39 |
| 2014/0035526 A1 | 2/2014 | Tripathi et al. | |
| 2014/0206384 A1 | 7/2014 | Kim et al. | |
| 2014/0266025 A1* | 9/2014 | Jakubowski | H02J 5/005 320/108 |
| 2014/0327323 A1 | 11/2014 | Masaoka et al. | |
| 2015/0028688 A1 | 1/2015 | Masaoka | |
| 2015/0244201 A1* | 8/2015 | Chu | H02J 7/025 320/108 |
| 2016/0036498 A1* | 2/2016 | Chu | H04W 4/80 455/41.1 |
| 2016/0050531 A1* | 2/2016 | Choi | H04W 4/023 455/456.2 |
| 2016/0057564 A1 | 2/2016 | Sim | |
| 2016/0057790 A1 | 2/2016 | Sim | |
| 2016/0099611 A1 | 4/2016 | Leabman et al. | |
| 2016/0149432 A1* | 5/2016 | Knepper | H02J 7/025 320/108 |
| 2016/0159233 A1 | 6/2016 | Kim | |
| 2016/0301238 A1* | 10/2016 | Khoshvenis | H02J 7/0047 |
| 2016/0301251 A1* | 10/2016 | Cho | H02J 50/90 |
| 2017/0085127 A1* | 3/2017 | Leabman | H02J 17/00 |
| 2017/0104372 A1* | 4/2017 | Kadoyama | H02J 50/12 |
| 2018/0233966 A1* | 8/2018 | Yang | H02J 50/60 |
| 2018/0254639 A1* | 9/2018 | Bell | H02J 50/20 |

FOREIGN PATENT DOCUMENTS

| | | |
|---|---|---|
| KR | 10-2014-0095411 A | 8/2014 |
| WO | 2013/098947 A1 | 7/2013 |
| WO | 2013/128597 A1 | 9/2013 |

* cited by examiner

METHOD AND DEVICE FOR WIRELESSLY TRANSMITTING POWER

CROSS-REFERENCE TO RELATED APPLICATION(S)

This application claims the benefit under 35 U.S.C. § 119(e) to a U.S. Provisional Patent application filed on Mar. 31, 2016 in the U.S. Patent and Trademark Office and assigned Ser. No. 62/315,869, and under 35 U.S.C. § 119(a) of a Korean patent application filed in the Korean Intellectual Property Office on Oct. 10, 2016 and assigned Serial number 10-2016-0130790 and a Korean patent application filed in the Korean Intellectual Property Office on Jan. 3, 2017 and assigned Serial number 10-2017-0000732, the entire disclosure of each of which is hereby incorporated by reference.

TECHNICAL FIELD

The present disclosure relates to a wireless power transmitting method and device.

BACKGROUND

A mobile terminal, such as a portable phone, is powered using a rechargeable battery due to its characteristics, and electronic energy needs to be provided using a separate charging device to charge the battery. Generally, a contact terminal is separately configured in a charging device and a battery, and the charging device may provide power to the battery by physically coupling the contact terminals.

However, the contact terminal protrudes from the outside and is easily contaminated by foreign substance, and thus, the contact-based charging scheme, as described above, has a drawback in that the battery may be charged improperly. Also, when the contact terminal is exposed to humidity, the battery may be charged improperly.

Recently, a wireless charging or a non-contact charging technology has been developed and used for electronic devices to address the above-mentioned problem.

The wireless charging technology uses wireless power transmission and reception, and corresponds to, for example, a system in which a battery is automatically charged if the battery is placed on a charging pad without connecting a portable phone to a separate charging connector. The wireless charging technology is generally applied to a wireless electric toothbrush, a wireless electric shaver, or the like. The wireless charging technology can improve a waterproofing function because it can be used to wirelessly charge the electronic devices. The wireless charging technology can improve the portability of the electronic devices because it does not require a wired charger.

The wireless charging technology may be generally classified as an electromagnetic induction scheme, a resonant scheme, and an electromagnetic wave radiation (radio frequency (RF)/microwave radiation) scheme that converts electric energy into electromagnetic waves and transfers power over a remote distance.

Until now, the electromagnetic induction scheme has mainly been utilized. However, recently, an experiment that wirelessly transmits power from a distance of several tens of meters, using electromagnetic waves, has been successfully conducted.

An electromagnetic induction scheme transmits electric power between a primary coil and a secondary coil. A magnetic field is generated around the primary coil when a current flows through the primary coil, and a current may be induced in the secondary coil included in a receiving end as the electromagnetic field generated in the primary coil changes. This is referred to as a magnetic induction and the power transmission method using magnetic induction has a high energy transmission efficiency.

With respect to the resonance scheme, power is wirelessly transferred using an electric power transmission principle of the resonance scheme based on a coupled mode theory even if a device to be charged is separated from a charging device by several meters. The electromagnetic wave containing the electrical energy resonates instead of making sounds resonate. However, the resonant electrical energy does not affect surrounding machines or human bodies differently from other electromagnetic waves because the resonant electrical energy is directly transferred only into a device having a resonance frequency and unused energy is reabsorbed into an electromagnetic field instead of spreading into the air.

The wireless charging technology does not use wires, and thus, may simultaneously charge a large number of wireless power receiving devices, which is an advantage. However, when many wireless power receiving devices request wireless power recklessly, the efficiency may decrease. Therefore, they need to be controlled. Also, when the wireless charging technology is used commercially, power needs to be supplied to only an authenticated wireless power receiving device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a wireless power transmitting system.

In accordance with an aspect of the present disclosure, a wireless power transmitting method of a wireless power transmitting device is provided. The method includes receiving device information of a wireless power receiving device from a server, authenticating the wireless power receiving device based on the device information, and wirelessly transmitting power to the wireless power receiving device based on a result of the authentication.

According to another embodiment of the present disclosure, there is provided a wireless power transmitting method of a wireless power transmitting device, the method including receiving, from the wireless power receiving device, communication information and location information of a first point where a wireless power receiving device is located, establishing communication with the wireless power receiving device based on the communication information, determining a phase and an amplitude of an electromagnetic wave transmitted to the wireless power receiving device based on the location information, and transmitting an electromagnetic wave having the determined phase and amplitude to the wireless power receiving device.

According to another embodiment of the present disclosure, there is provided a wireless power transmitting device, the wireless power transmitting device including a wireless power transmitting unit, a communication unit, and a controller. The controller receives device information of the wireless power receiving device from the server through the communication unit, authenticates the wireless power receiving device based on the device information, and controls the wireless power transmitting unit to transmit power wirelessly to the wireless power receiving device based on a result of the authentication.

According to another embodiment of the present disclosure, there is provided a wireless power receiving device, the wireless power receiving device including a power receiving unit, a communication unit, and a controller. The controller obtains, through the communication unit, communication establishment information and location information associated with a wireless charging area from a tag device, establishes, through the communication unit, communication with a wireless power transmitting device based on the communication establishment information, transmit, through the communication unit, the location information to the wireless power transmitting device, and control to receive, through the power receiving unit, the power from the wireless power transmitting device after transmitting the location information.

According to another embodiment of the present disclosure, there is provided a device for transmitting a power, the device including a communication unit, a power transmitting unit, and a processor. The processor receives, through the communication unit, location information associated with a wireless charging area from the wireless power receiving device, and controls to transmit, through the power transmitting unit, the power wirelessly based on the location information.

According to another embodiment of the present disclosure, there is provided a wireless power transmitting device, the wireless power transmitting device including a wireless power transmitting unit, a communication unit, and a controller. The controller receives pairing information and location information of a first point where the wireless power receiving device is located from the wireless power receiving device through the communication unit, performs pairing with the wireless power receiving device based on the pairing information, determines a phase and an amplitude of an electromagnetic wave transmitted to the wireless power receiving device based on the location information, and transmits an electromagnetic wave having the determined phase and amplitude to the wireless power receiving device through the wireless power transmitting unit.

According to another embodiment of the present disclosure, there is provided a wireless power receiving device, the wireless power receiving device including a communication unit that communicates with at least one of a wireless power transmitting device and a server, a power receiving unit that receives power wirelessly, and a controller that controls the communication unit and the power receiving unit. The controller may obtain communication establishment information and location information associated with a wireless charging area from a tag device through the communication unit, establish communication with the wireless power transmitting device based on the communication establishment information, transmit the location information associated with the wireless charging area to the wireless power transmitting device, and wirelessly receive power from the wireless power transmitting device.

The tag device may include at least one of a near field communication (NFC) tag, a radio frequency identification (RFID) tag, a QR code, a bar code, and a magnetic secure transmission (MST) device.

The wireless power receiving device may further include a battery, and the controller may charge the battery using the power, and transmit a charge complete signal to the wireless power transmitting device when the battery is completely charged.

The wireless power receiving device may access the server using the communication establishment information, and may transmit payment information of the wireless power receiving device to the server.

According to another embodiment of the present disclosure, there is provided a wireless power transmitting device, the wireless power transmitting device including a communication unit that communicates with at least one of a wireless power receiving device and a server, a power transmitting unit that transmits power wirelessly, and a controller that controls the communication unit and the power transmitting unit. The controller may receive location information associated with a wireless charging area from the wireless power receiving device, and transmit power wirelessly to the wireless power receiving device based on the location information.

The controller may control at least one of a phase and an amplitude of an electromagnetic wave corresponding to the power based on the location information.

The controller may receive a charge complete signal from the wireless power receiving device, and may control an amount of power to be transmitted to the wireless power receiving device based on the received charge complete signal.

The controller may receive payment information from the wireless power receiving device, and may transmit power wirelessly to the wireless power receiving device based on the payment information.

The payment information includes an amount of payment, and the controller may determine an amount of power to be transmitted to the wireless power receiving device based on the amount of payment.

The payment information includes credit card information, and the controller may start a wireless power transmission to the wireless power receiving device based on a reception of the credit card information from the wireless power receiving device.

According to another embodiment of the present disclosure, there is provided a wireless power receiving method of a wireless power receiving device, the method including obtaining communication establishment information and location information associated with a wireless charging area from a tag device, establishing communication with a wireless power transmitting device based on the communication establishment information, transmitting the location information to the wireless power transmitting device, and wirelessly receiving power from the wireless power transmitting device.

The tag device may use one of a near field communication (NFC) tag, a radio frequency identification (RFID) tag, and a magnetic secure transmission (MST) device, and may be embodied as a quick response code and a bar code.

According to an aspect of the present disclosure, the method may further include charging a battery of the wireless power receiving device using the received power, and transmitting a charge complete signal to the wireless power transmitting device when the battery is completely charged.

According to an aspect of the present disclosure, the method may further include accessing a server using the communication establishment information, and transmitting payment information of the wireless power receiving device to the server.

According to another embodiment of the present disclosure, there may be provided a wireless power transmitting method of a wireless power transmitting device, the method including receiving location information associated with a wireless charging area from a wireless power receiving device, and wirelessly transmitting power to the wireless power receiving device based on the location information.

Transmitting the wireless power may further include controlling at least one of a phase and an amplitude of an electromagnetic wave corresponding to the power based on the location information associated with the wireless charging area.

According to an aspect of the present disclosure, the method may further include receiving a charge complete signal from the wireless power receiving device, and controlling the amount of power based on the charge complete signal.

According to an aspect of the present disclosure, the method may further include receiving payment information from the wireless power receiving device, and wirelessly transmitting power to the wireless power receiving device based on the payment information.

The payment information includes an amount of payment, and the method may further include determining an amount of power to be transmitted to the wireless power receiving device based on the amount of payment.

The payment information includes credit card information, and the method may further include starting a wireless power transmission to the wireless power receiving device based on the credit card information received from the wireless power receiving device.

According to embodiments of the present disclosure, power may be supplied when a plurality of wireless power receiving devices are supplied with power. Also, when a plurality of wireless power transmitting devices exist, an amount of power required by each of the plurality of wireless power receiving devices may be efficiently supplied by controlling each wireless power transmission.

Also, a wireless power transmitting device may accurately recognize the location of a wireless power receiving device that wirelessly receives power, by using a tag device, readily connect communication with the wireless power receiving device, and efficiently wirelessly supply power to the wireless power receiving device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
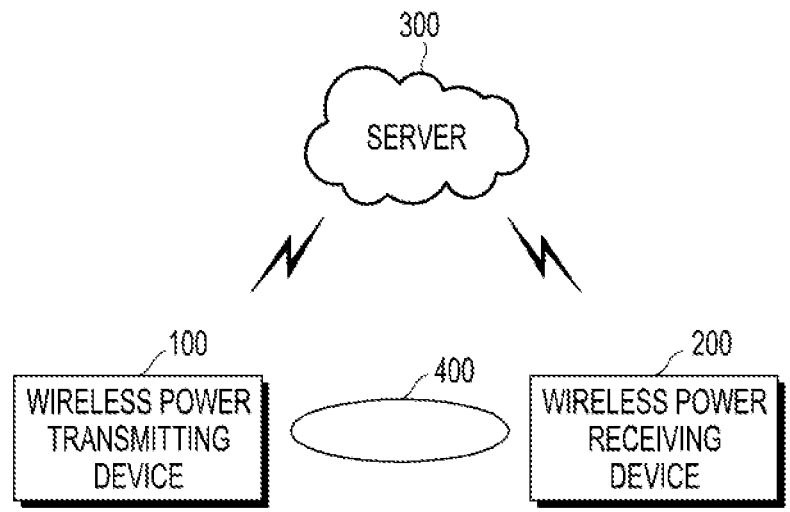
FIG. 1 is a diagram illustrating a configuration of a wireless charging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

A wireless power receiving device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit). In some embodiments, the wireless power receiving device may include at least one of, for example, a television (TV), a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

Further, the wireless power receiving device may include an internet of things (IoT) device and an IoT sensor, and the wireless power receiving device is not limited to the above-mentioned devices.

In the present disclosure, the term "user" may refer to a person who operates the wireless power receiving device. Further, the term "user" may refer to a device (e.g., artificial intelligence wireless power transmitting device or robot) that performs an operation of the wireless power receiving device.

In the present disclosure, the term "application" or "app" refers to a single or a set of computer programs, modules, or application programming interfaces (APIs) designed to perform a particular task. For example, the application may include a game application, a video playback application, a map application, a memo application, a calendar application, a phonebook application, a broadcasting application, an exercise support application, a payment application, a picture folder application, a medical appliance control application, a plurality of medical appliance user interface providing applications, and the like, and the applications may not be limited thereto.

Hereinafter, exemplary embodiments of the present disclosure will be described in detail with reference to the accompanying drawings.

FIG. 1 is a diagram illustrating a configuration of a wireless charging system according to an embodiment of the present disclosure.

Referring to FIG. 1, a wireless power transmitting device 100, a wireless power receiving device 200, and a server 300 are illustrated.

The wireless power transmitting device 100 may transmit wireless power 400 using at least one of an electromagnetic induction scheme, a resonance scheme, and an electromagnetic wave radiation scheme (radio frequency beam forming scheme). In the present document, the term "wireless power" may indicate an electric energy that is changed into a different form (e.g., an electromagnetic wave or a magnetic field) for wireless power transmission.

The wireless power transmitting device 100 may include a communication unit, and may communicate with the server 300 through the communication unit. For example, the wireless power transmitting device 100 may communicate with the server 300 through the internet or an intranet. The wireless power transmitting device 100 may have an internet protocol (IP) address, and the server 300 may communicate with the wireless power transmitting device 100 using the IP address.

The wireless power transmitting device 100 may receive, from the server 300, information associated with the wireless power receiving device 200 that will receive the wireless power 400. The server 300 may receive at least one of device information, payment information, and location information associated with a wireless charging area, from the wireless power receiving device 200.

The device information may include communication establishment information (e.g., an IP address) for establishing communication with the wireless power receiving device 200, information for identifying the wireless power receiving device 200 (e.g., a media access control (MAC) address, an unique ID, and an unique name), and charging state information.

The payment information may include information associated with an amount of payment and payment method information, such as credit card information to be used for charging the amount of payment.

The location information may include a coordinate of a tag device (not illustrated) that the wireless power receiving device 200 approaches or is in contact with, an area within a predetermined distance from the coordinate, and information indicating a predetermined area (e.g., a table) where the wireless power receiving device may be put on for charging.

The tag device may include a near field communication (NFC) tag, a radio frequency identifier (RFID) tag, a quick response (QR) code, a bar code, and a magnetic secure transmission (MST) device, but may not be limited thereto. The wireless power receiving device 200 may obtain data using a camera when the tag device is a QR code or a bar code.

Although the present disclosure provides descriptions from the perspective of an NFC tag for ease of description, the functions and the operations may be equally performed even when an NFC tag, an RFID tag, a QR code, a bar code, and an MST device are used.

The tag device may include communication establishment information and location information associated with a wireless charging area. The communication establishment information may include information necessary to establish communication (e.g., an IP address, a MAC address, a domain name, etc.).

The wireless power transmitting device 100 may receive, from the server 300, information associated with an amount of wireless power 400 to be supplied to the wireless power receiving device 200, and may control an amount of wireless power 400 supplied to the wireless power receiving device 200.

The wireless power transmitting device 100 may communicate with the wireless power receiving device 200 through the communication unit. Particularly, the wireless power transmitting device 100 may receive device information of the wireless power receiving device 200, payment information, and location information associated with a wireless charging area, from the wireless power receiving device 200.

The device information may include communication establishment information (e.g., an IP address) for establishing communication with the wireless power receiving device 200, information for identifying the wireless power receiving device 200 (e.g., a MAC address, an unique ID, and a unique name), and charging state information.

Payment information may include information associated with an amount of payment, and may include credit card information.

The wireless power transmitting device 100 may communicate with the wireless power receiving device 200 using device information received from the wireless power receiving device 200, and may transmit wireless power 400 to the wireless power receiving device 200. For example, when the wireless power receiving device 200 transmits payment information and device information to the server 300, the server 300 may determine an amount of wireless power to be transmitted to the wireless power receiving device 200 based on the payment information and the device information. The server 300 transmits information associated with the determined amount of wireless power to the wireless power transmitting device 100, so that the wireless power transmitting device 100 may transmit the determined amount of wireless power to the wireless power receiving device 200.

The wireless power receiving device 200 may access the server 300 of a service company that a user subscribes to, and may transmit payment information and device information to the server 300. Also, the wireless power receiving device 200 may select the server 300 of a service company that is capable of providing a service, to access the server 300, and may transmit payment information and device information to the server 300. Also, the wireless power receiving device 200 may approach or be in contact with a tag device including access information of the server 300 that is to provide a service, may obtain the access information, and may access the server 300 using the obtained access information. That is, when the wireless power receiving device 200 approaches or is in contact with a tag device, such as an NFC tag, the wireless power receiving device 200 may obtain server access information included in the tag device, and the wireless power receiving device 200 may transmit payment information and device information to the server 300 using the server access information.

The payment information may include an amount of payment and credit card information. Particularly, the payment information may include a name of a credit card to be used for payment, a credit card number, and information associated with an amount of payment. The payment information may also include device information.

The server 300 may determine an amount of wireless power to be transmitted to the wireless power receiving device 200 using the payment information.

The server 300 may determine the wireless power receiving device 200 that is to receive the wireless power 400, based on the device information. The device information may include an IP address of the wireless power receiving device 200, and the server 300 may establish communication with the wireless power receiving device 200 using the IP address.

The server 300 may transmit the device information and information associated with the amount of wireless power, to the wireless power transmitting device 100. The wireless power transmitting device 100 may establish communication with the wireless power receiving device 200 located around the wireless power transmitting device 100 based on the device information received from the server 300, and may transmit wireless power to the wireless power receiving device 200.

Particularly, the wireless power transmitting device 100 searches for a wireless power receiving device using the device information, such as an IP address, and may transmit wireless power to the retrieved wireless power receiving device 200. In this instance, an amount of wireless power supplied to the wireless power receiving device 200 may be equal to an amount of wireless power corresponding to an amount of payment that a user inputs in the wireless power receiving device 200.

When the wireless power transmitting device 100 transmits, to the server 300, information associated with an amount of wireless power transmitted to the wireless power receiving device 200, the server 300 may determine an amount of payment corresponding to the amount of wireless power.

The wireless power transmitting device 100 may request device information from the wireless power receiving device 200. The wireless power transmitting device 100 may periodically transmit a broadcasting signal to search for the wireless power receiving device 200 proximate to the wireless power transmitting device 100, receive device information that the wireless power receiving device 200 transmits in response to the broadcasting signal, compare the received device information with device information received from the server 300, authenticate the wireless power receiving device 200, and communicate with the wireless power receiving device 200.

The wireless power receiving device 200 may establish communication with the wireless power transmitting device 100 using information included in a tag device that is attached to a wireless charging device or a wireless charging area. Herein, the descriptions thereof will be omitted since the descriptions will be provided in detail with reference to FIG. 4.

The tag device may indicate a tag that stores information, and may include an NFC tag, an RFID tag, a QR code, a bar code, and an MST device. However, the tag device may not be limited thereto. The NFC tag, the RF ID, and the MST device may use electromagnetic signal transmission, and the QR code and the bar code may use optical signal transmission.

Although the present disclosure provides descriptions from the perspective of an NFC tag for ease of description, the functions and the operations may be equally performed even when an RFID tag, a QR code, a bar code, and an MST device are used.

The wireless power transmitting device 100 receives charging state information from the wireless power receiving device 200, and may adjust an amount of power of transmitted wirelessly or stop transmitting the wireless power based on the charging state information. The charging state information may include a charge complete signal.

The charging state information of the wireless power receiving device 200 may be, for example, information associated with a residual quantity of power of a battery included in the wireless power receiving device 200. The wireless power receiving device 200 may transmit the information regarding the remaining amount of power of the battery, e.g. battery level information, to the wireless power transmitting device 100 based on a request from the wireless power transmitting device 100. In this instance, the wireless power transmitting device 100 transmits, to the server 300, information associated with an amount of wireless power transmitted to the wireless power receiving device 200, and the server 300 may determine an amount of payment for wireless power based on the information and payment information received from the wireless power receiving device 200.

Figure 2:
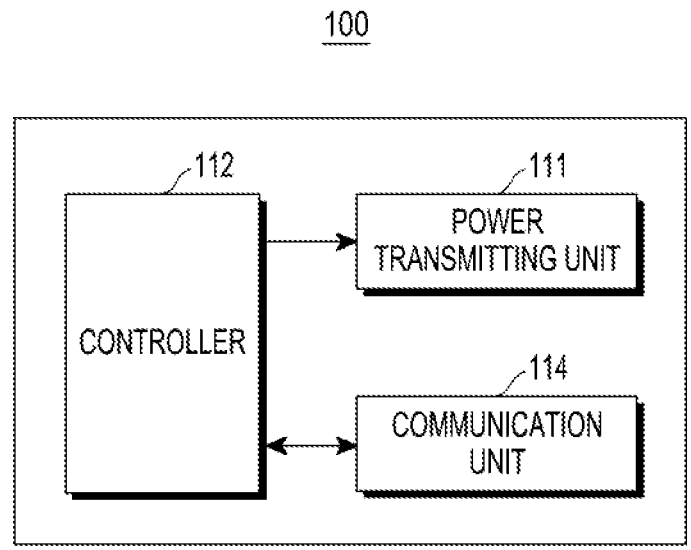
FIG. 2 is a block diagram of a wireless power transmitting device according to an embodiment of the present disclosure.

FIG. 2 is a block diagram of a wireless power transmitting device according to an embodiment of the present disclosure.

Referring to FIG. 2, the wireless power transmitting device 100 may include a power transmitting unit 111, a controller 112, and a communication unit 114.

The power transmitting unit 111 may convert power supplied from a power supplying unit (not illustrated) to wireless power and transmit the same to the wireless power receiving device 200. The power transmitting unit 111 may transmits the power wirelessly. The wireless power transferred by the power transmitting unit 111 may be formed in the type of a magnetic field or an electromagnetic wave. To this end, the power transmitting unit 111 may include at least one of a coil, a resonator, and an antenna. The power transmitting unit 111 may include an element for generating wireless power based on the power transmission scheme. For example, the power transmitting unit 111 that implements the induction scheme may include a primary coil that forms a magnetic field, which changes to induce a current to a secondary coil of the wireless power receiving device 200. The power transmitting unit 111 that implements the resonant scheme may include a resonator that forms a magnetic field having a predetermined resonant frequency to generate a resonance phenomenon to the wireless power receiving device 200. Also, the power transmitting unit 111 that implements the electromagnetic wave scheme may include an array antenna formed of a plurality of patch antennas to transmit an electromagnetic wave of a predetermined frequency to the wireless power receiving device 200.

Also, the power transmitting unit 111 may transfer wireless power using any combination of the induction method, the resonant method, and the electromagnetic wave method.

The power transmitting unit 111 may be configured to further include a circuit that controls characteristics, such as a frequency, an applied voltage, an applied current, and the like, which are used for forming wireless power.

The controller 112 (e.g. a processor) may control each element included in the wireless power transmitting device 100. The controller 112 may be formed of at least one processor to control operations of the wireless power transmitting device 100. Also, the controller 112 may be integral with another controller (not illustrated) that controls the wireless power transmitting device 100. For example, the controller 112 or the controller 292 in the wireless power receiving device 200 may be implemented as at least one of a processor, a micro processing unit (CPU), a micro controlling unit (MCU), a micro processing unit (MPU), a micro processor computer (MICOM), a field programmable gate array (FPGA), an application specific integrated circuit (ASIC) and an integrated circuit (IC).

The controller 112 may control the communication unit 114 and the power transmitting unit 111.

The controller 112 may identify or authenticate the wireless power receiving device 200 in response to detecting the wireless power receiving device 200, or may determine whether to start a wireless power transmission.

Also, the controller 112 may determine at least one of a frequency, a phase, a voltage, and a current of the power transmitting unit 111 for forming wireless power, e.g. RF wave. The characteristics may be determined based on a condition of the wireless power transmitting device 100, or based on a condition of the wireless power receiving device 200.

The controller 112 may receive device information of the wireless power receiving device 200, payment information, location related information associated with a wireless charging area, from the wireless power receiving device 200.

The device information, the payment information, and the location information are the same as the descriptions which have been described in FIG. 1, and herein, detailed descriptions thereof will be omitted.

The controller 112 may perform control to transmit wireless power to the wireless power receiving device 200 based on the location information. When the wireless power transmitting device 100 uses an electromagnetic wave method, the controller 112 may control at least one of a phase and an amplitude of an electromagnetic wave corresponding to wireless power based on the location information.

The controller 112 may receive a charge complete signal from the wireless power receiving device 200 and control an amount of wireless power transmitted to the wireless power receiving device 200 based on the charge complete signal. Controlling the amount of wireless power may include interrupting a wireless power transmission.

The controller 112 may receive payment information from the wireless power receiving device 200, determine an amount of wireless power to be transmitted to the wireless power receiving device 200 based on the received payment information, and transmit wireless power to the wireless power receiving device 200 based on the determined amount of wireless power.

The controller 112 may transmit, to the server 300, information associated with an amount of wireless power transmitted to the wireless power receiving device 200.

The communication unit 114 may communicate with the wireless power receiving device 200 based on a short-range communication scheme, such as wireless fidelity (Wi-Fi), Bluetooth, Bluetooth low energy (BLE), and Zigbee®. Also, the communication unit 294 may transmit device information and payment information to a server based on a communication scheme, such as long term evolution (LTE), LTE advance (LTE-A), code division multiple access (CDMA), wideband CDMA (WCDMA), universal mobile telecommunications system (UMTS), wireless broadband (WiBro), or global system for mobile communications (GSM).

Meanwhile, these communication schemes are only examples, and the scope of the present disclosure is not limited by a specific communication scheme which is performed by the communication unit 114.

The communication unit 114 may receive device information, payment information, and location information associated with a wireless charging area from the wireless power receiving device 200.

The communication unit 114 may communicate with another wireless power transmitting device (not illustrated) and the server 300, in addition to the wireless power receiving device 200. For example, the communication unit 114 may receive, from a server, the device information of the wireless power receiving device 200 and information associated with an amount of wireless power to be transmitted to the wireless power receiving device 200.

When the communication unit 114 receives payment information from the wireless power receiving device 200, the communication unit 114 may retransmit the payment information to the server. Also, the communication unit 114 may transmit, to the server, information associated with an amount of wireless power transmitted to the wireless power receiving device 200.

Figure 3:
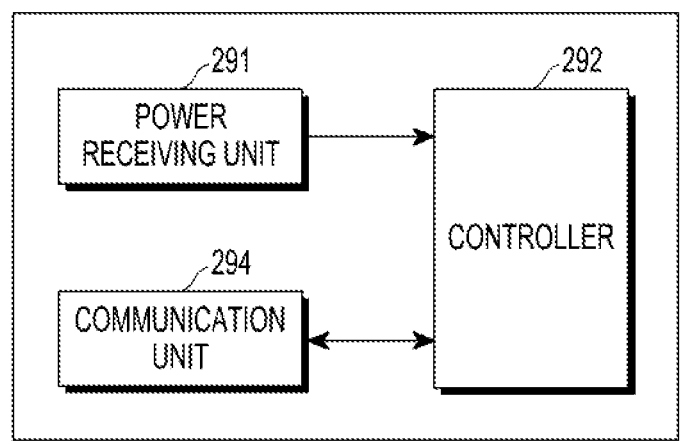
FIG. 3 is a block diagram of a wireless power receiving device according to an embodiment of the present disclosure.

FIG. 3 is a block diagram of the wireless power receiving device 200 according to an embodiment of the present disclosure.

Referring to FIG. 3, the wireless power receiving device 200 may include a power receiving unit 291, a communication unit 294, and a controller 292.

The power receiving unit 291 may receive wireless power transmitted from the wireless power transmitting device 100. The power receiving unit 291 may include an element required for receiving wireless power according to a wireless power transmission scheme. Also, the power receiving unit 291 may receive wireless power according to one or more wireless power transmission schemes. In this instance, the power receiving unit 291 may include an element required for each scheme.

The power receiving unit 291 may be configured to include at least one of a coil, a resonator, and an antenna for receiving wireless power transferred in the form of a magnetic field or an electromagnetic wave.

For example, based on the induction scheme, the power receiving unit 291 may include a secondary coil to which a current may be induced by a magnetic field that varies. Based on the resonant scheme, the power receiving unit 291 may include a resonant circuit having a predetermined resonant frequency. Based on the electromagnetic scheme, the power receiving unit 291 may include an array antenna formed of a plurality of patch antennas.

The power receiving unit 291 may include a rectifier circuit (not illustrated) and a regulator circuit (not illustrated) for converting the received power to direct current (DC) power. Also, the power receiving unit 291 may further include a circuit for preventing an over voltage or an over current caused by a received power signal. The wireless power receiving device 200 may further include a circuit for transferring, to a load, the DC power that is output through the rectifier circuit and the regulator circuit. For example, when the load is a battery, a charging integrated circuit (IC) is further included in the wireless power receiving device 200 and the battery may be charged using the DC power.

The controller 292 may include one or more processors, and may control each element included in the wireless power receiving device 200. The controller 292 may control the communication unit 294, and may transfer charging state information to the wireless power transmitting device 100.

The charging state information may instruct the wireless power transmitting device 100 to initiate or terminate transferring wireless power. Also, the charging state information may instruct the wireless power transmitting device 100 to control the characteristics of wireless power. The charging state information may include a charge complete signal indicating that charging is completed.

The controller 292 may control the communication unit 294 and the power receiving unit 291.

The controller 292 may obtain communication establishment information and location information associated with a wireless charging area from a tag device through the communication unit 294, establish communication with the wireless power transmitting device 100 based on the communication establishment information obtained from the tag device, transmit the location information associated to the wireless power transmitting device 100, and control the power receiving unit 291 to receive wireless power transmitted from the wireless power transmitting device 100.

Also, the wireless power receiving device 200 may include a battery (not illustrated), and the controller 292 may be configured to charge the battery using wireless power received from the wireless power transmitting device 100 through controlling the charging IC, and transmit the charging state information (e.g., a charge complete signal) to the wireless power transmitting device 100 when charging of the battery is completed.

The controller 292 may control the communication unit 294 to receive server access information for accessing the server 300 from a tag device, perform communication with the server 300 using the server access information, and transmit payment information of the wireless power receiving device 200 to the server 300.

The wireless power receiving device 200 may be an electronic device, and the electronic device may include a portable phone, a smart phone, a PDA, a PMP, a navigation device, a slate PC, a tablet PC, an ultrabook, a wearable device (e.g., a watch-type terminal (smartwatch), a glasses-type terminal (smartglass), an HMD, etc.), and the like.

The communication unit 294 may perform communication with the communication unit 114 of the wireless power transmitting device 100, according to a predetermined scheme. A communication scheme of a communication unit has been described in the descriptions of FIG. 2, and thus, detailed descriptions thereof will be omitted.

The controller 292 may transmit device information, payment information, and location information to the wireless power transmitting device 100 through the communication unit 294. The controller 292 may transmit device information, payment information, and location information to the server 300 through the communication unit 294.

Figure 4:
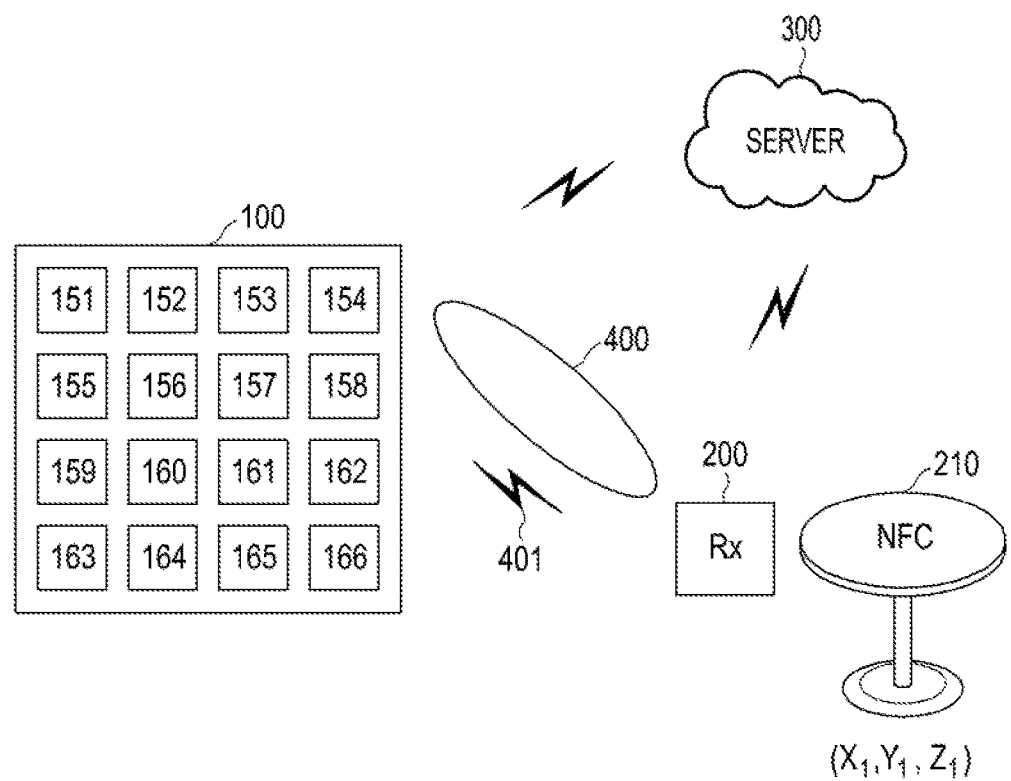
FIG. 4 is a diagram illustrating a wireless charging system using a wireless power transmitting device that uses an electromagnetic wave scheme according to an embodiment of the present disclosure.

FIG. 4 is a diagram illustrating a wireless charging system using a wireless power transmitting device that uses an electromagnetic wave scheme according to an embodiment of the present disclosure.

Referring to FIG. 4, the wireless power transmitting device 100, the wireless power receiving device 200, an NFC tag 210, and the server 300 are illustrated.

The wireless power transmitting device 100 may wirelessly transmit power to at least one wireless power receiving device 200. The wireless power transmitting device 100 may include a plurality of patch antennas 151 to 166. Each of the patch antennas 151 to 166 may generate an electromagnetic wave. At least one of an amplitude and a phase of an electromagnetic wave that the patch antennas 151 to 166 generates may be controlled by the wireless power transmitting device 100. For ease of description, an electromagnetic wave generated by each of the patch antennas 151 to 166 is referred to as a sub-electromagnetic wave.

The wireless power transmitting device 100 may control at least one of an amplitude and a phase of each of the sub-electromagnetic waves generated from the patch antennas 151 to 166. The sub-electromagnetic waves may interfere with one another. For example, sub-electromagnetic waves may act as constructive interference to each other at one point, and may act as destructive interference to each other at another point.

The wireless power transmitting device 100 may control at least one of an amplitude and a phase of each of the sub-electromagnetic waves radiated by the patch antennas 151 to 166, so that the sub-electromagnetic waves act as constructive interference at a first point $(x_1, y_1, z_1)$.

To receive wireless power from the wireless power transmitting device 100, the wireless power receiving device 200 may approach or be in contact with the NFC tag 210 and may obtain location information associated with a wireless charging area included in the tag device. When the NFC tag 210 is located in the first point $(x_1, y_1, z_1)$, the tag device may include location information of the first point, an NFC tag ID, an IP address of the wireless power transmitting device 100, and access information of a server to be accessed, as described above with reference to FIG. 1. The location information may include an area within a predetermined distance from the first point, and may include an ID of a charging area. When the location information is an ID of a charging area, a condition (e.g., a direction, a distance, a coordinate, a phase and an amplitude of an electromagnetic wave, and the like) for transmitting wireless power to correspond to the charging area IP, may be stored in the wireless power transmitting device 200 or the server 300. That is, the wireless power transmitting device 100 may transmit wireless power to the wireless power receiving device 200 using the condition corresponding to the received charging area ID.

When a user places the wireless power receiving device 200 close to or into contact with an NFC tag, the wireless power receiving device 200 may obtain information included in the NFC tag.

That is, the wireless power receiving device 200 obtains location information (e.g., coordinates) of the first point $(x_1, y_1, z_1)$ and communication establishment information, such as the IP address of the wireless power transmitting device 100, and may establish communication with the wireless power transmitting device 100. The location information may be location information associated with a wireless charging area.

The NFC tag may be replaced with a QR code or an RFID tag. The wireless power receiving device 200 may obtain the location information and the communication establishment information of the wireless power transmitting device 100 through the QR code or the RFID tag. The wireless power receiving device 200 may photograph a QR code using a camera, and may obtain the location information of the first point (i.e., the location information associated with a wireless charging area) and communication establishment information of the wireless power transmitting device 100 through the photographed QR code.

The wireless power receiving device 200 may establish communication between the wireless power transmitting device 100 and the wireless power receiving device 200 using communication establishment information, and may transmit location information to the wireless power transmitting device 100. The wireless power receiving device 200 may perform communication with the wireless power transmitting device 100, which is required for the reception of wireless power using the communication establishment information.

The wireless power transmitting device 100 may transmit the wireless power 400 using the location information that is received from the wireless power receiving device 200. For example, when wireless power is transmitted according to an electromagnetic wave scheme, the wireless power transmitting device 100 may control at least one of a phase and an amplitude of each sub-electromagnetic wave based on the location information that is received from the wireless power receiving device 200, and may transmit the wireless power 400 to the wireless power receiving device 200.

To enable the wireless power receiving device 200 to receive wireless power with a high efficiency, sub-electromagnetic waves act as constructive interference at the first point $(x_1, y_1, z_1)$ where the wireless power receiving device 200 is to be placed for charging (i.e., receiving the wireless power). Accordingly, the wireless power transmitting device 100 may control the patch antennas 151 to 166 to enable the sub-electromagnetic waves to act as constructive interference to each other at the first point $(x_1, y_1, z_1)$. Here, controlling the patch antennas 151 to 166 may indicate controlling an amplitude of a signal input to the patch antennas 151 to 166, or controlling a phase (or delay) of a signal input to the patch antennas 151 to 166.

A person skilled in the art may readily understand beam forming that controls an electromagnetic wave to act as constructive interference at a predetermined point. In addition, a person skilled in the art may readily understand that a type of beam forming techniques can be implemented. For example, various beam forming methods, such as US patent application publication number 2016/0099611, US patent application publication number 2016/0099755, and US patent application publication number 2016/0100124, and the like, may be used. The form of an electromagnetic wave formed by beam forming may be referred to as pockets of energy.

Accordingly, the electromagnetic waves formed by sub-electromagnetic waves may have the maximum amplitude at the first point $(x_1, y_1, z_1)$, and thus, the wireless power receiving device 200 may receive the wireless power 400 with a high efficiency.

More particularly, when the wireless power receiving device 200 is disposed on a right side of the wireless power transmitting device 100, the wireless power transmitting device 100 may apply a greater delay to sub-electromagnetic waves formed by the right-side patch antennas (e.g., patch antennas 154, 158, 162, and 166) than the left-side patch antennas (e.g., patch antennas 151, 155, 159 and 163). That is, sub-electromagnetic waves may be generated from the right-side patch antennas (e.g., patch antennas 154, 158, 162, and 166) after a predetermined period of time from when sub-electromagnetic waves that are generated by the left-side patch antennas (e.g., patch antennas 151, 155, 159 and 163). Accordingly, sub-electromagnetic waves may meet at the same time at a point on the right-side, and thus, the sub-electromagnetic waves may generate constructive interference at a point on the right-side. When beam forming is performed to transmit the wireless power 400 to the wireless power receiving device 200 located in a center point, the wireless power transmitting device 100 may radiate sub-electromagnetic waves generated by applying substantially the same delay to the left-side patch antennas (e.g., patch antennas 151, 155, 159, and 163) and right-side patch antennas (e.g., patch antennas 154, 158, 162, and 166), and may transmit the wireless power 400 to the wireless power receiving device 200. Also, when beam forming is performed to transmit the wireless power 400 to the wireless power receiving device 200 located at a point to the left of the wireless power transmitting device 100, a larger delay may be applied to the left-side patch antennas of the antenna array (e.g., patch antennas 151, 155, 159 and 163) as compared to the right-side patch antennas (e.g., patch antennas 154, 158, 162, and 166).

As described above, the wireless power transmitting device 100 may determine a location to which wireless power is to be transmitted using the information of the NFC tag 210 transmitted from the wireless power receiving device 200, generate constructive interference by sub-electromagnetic waves at the determined location, and perform wireless charging with a high transmission efficiency. That is, the wireless power transmitting device 100 may control a phase and an amplitude of an electromagnetic wave radiated through a patch antenna based on the location information.

Figure 5:
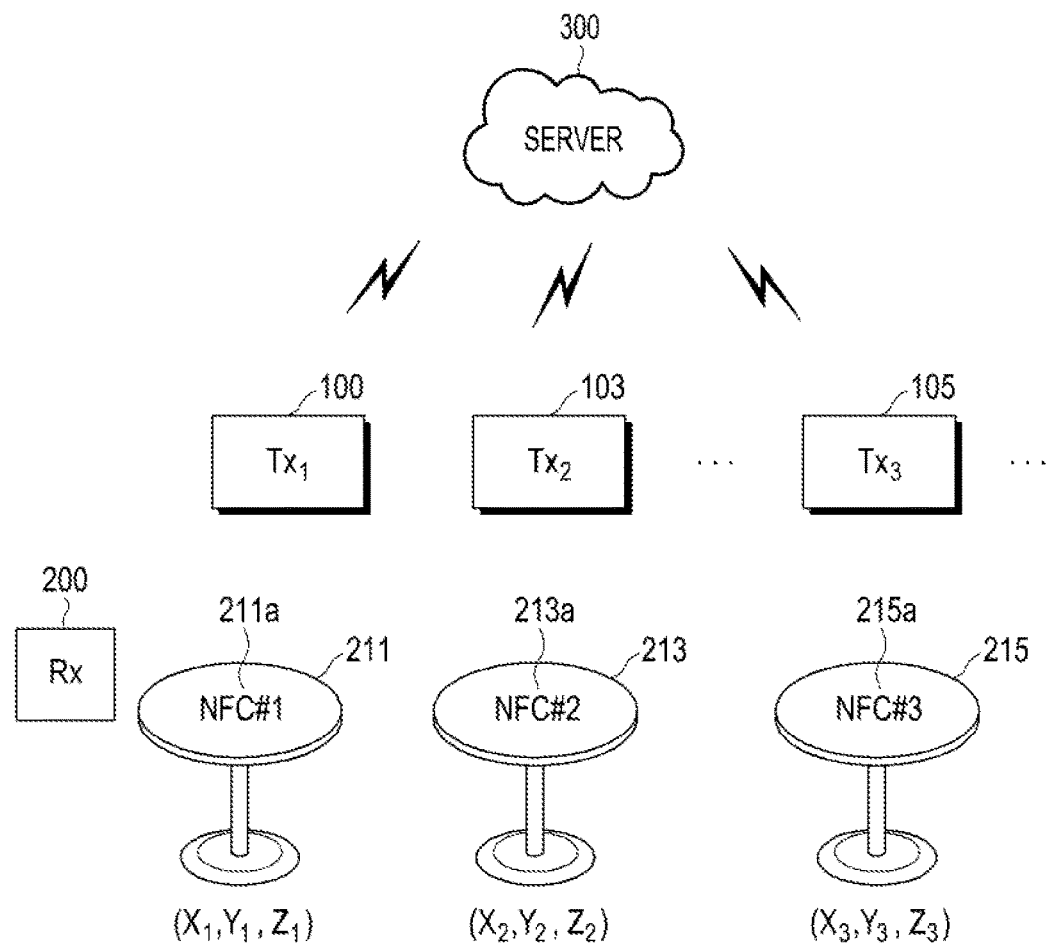
FIG. 5 is a diagram illustrating an example of a wireless charging system that uses an electromagnetic wave scheme according to an embodiment of the present disclosure.

FIG. 5 is a diagram illustrating an example of a wireless charging system that uses an electromagnetic wave scheme according to an embodiment of the present disclosure.

Referring to FIG. 5, the wireless charging system includes a plurality of wireless power transmitting devices 100, 103, and 105, a plurality of wireless charging tables 211, 213, and 215, the server 300, and the wireless power receiving device 200 are illustrated.

For ease of descriptions, descriptions will be provided by assuming that the wireless power receiving device 200, such as a portable terminal, enters a wireless charging system. The first wireless power transmitting device 100 includes the first wireless charging table 211. A first NFC tag 211a may be attached to the first wireless charging table 211. The first NFC tag 211a may include location information of the first wireless charging table 211, communication establishment information required for a communication connection with the first wireless power transmitting device 100, and access information of the server 300 for charging for wireless charging, and the like. Although descriptions will be provided from the perspective of an NFC tag for ease of description, the same functions may be performed using an RFID tag, a QR code, and an MST device.

The first NFC tag 211a may include location information of the first wireless charging table, for example, a coordinate $(x_1, y_1, z_1)$ or a wireless charging table ID, communication establishment information required for establishment of communication with the first wireless power transmitting device 100 and an IP address of the server 300.

The second wireless power transmitting device 103 includes the second wireless charging table 213. A second NFC tag 213a may be attached to the second wireless charging table 213. The second NFC tag 213a may include location information of the second wireless charging table 213, communication establishment information required for a communication connection with the second wireless power transmitting device 103, and access information of the server 300 to be accessed for the purpose of charging, and the like. For example, the second NFC tag 213a may include a coordinate $(x_2, y_2, z_2)$ of the second wireless charging table or a wireless charging table ID, communication establishment information required for establishment of communication with the second wireless power transmitting device 103 and an IP address of the server 300.

The third wireless power transmitting device 105 includes the third wireless charging table 215. A third NFC tag 215a may be attached to the third wireless charging table 215. The third NFC tag 215a may include location information of the third wireless charging table 215, communication establishment information required for a communication connection with the third wireless power transmitting device 105, and access information of the server 300 to be accessed for the purpose of charging, and the like. For example, the third NFC tag 215a may include a coordinate $(x_3, y_3, z_3)$ of a wireless charging table or a wireless charging table ID, communication establishment information required for establishment of communication with the third wireless power transmitting device 105 and an IP address of the server 300.

Although it is described that one wireless charging table corresponds to one wireless power transmitting device, the present disclosure may not be limited thereto. It is also possible that one wireless power transmitting device corresponds to a plurality of wireless charging tables and wirelessly provides power to a wireless power receiving device that is placed for charging in each of the plurality of tables.

The functions and the elements of the wireless power transmitting devices 100, 103, and 105 and the wireless power receiving device 200 have been described in FIG. 4, and thus, detailed descriptions thereof will be omitted.

The server 300 may perform communication with the wireless power transmitting devices 100, 103, and 105, and the wireless power receiving device 200. The server 300 may perform communication and manage the wireless charging function of the wireless power transmitting devices 100, 103, and 105. For example, when the location of the wireless power receiving device 200 changes, the server 300 may determine a wireless power transmitting device based on the changed location information, and may enable the corresponding wireless power transmitting device to transmit wireless power to the wireless power receiving device 200. For example, when a user places the wireless power receiving device 200 close to or into contact with the first NFC tag 211a in the first wireless charging table 211 to receive wireless power, the wireless power receiving device 200 may transmit location information included in the first NFC tag 211a to the server 300. The server 300 receives the location information, determines the first wireless power transmitting device 100 as a wireless charging transmitting device based on the location information, and requests the first wireless power transmitting device 100 to transmit wireless power to the wireless power receiving device 200.

The wireless power receiving device 200 may transmit payment information to the server 300. The server 300 may analyze the payment information, determine an amount of power to be transmitted to the wireless power receiving device 200, and control the wireless power transmitting device 100 to the determined amount of wireless power. While receiving the wireless power from the first wireless power transmitting device 100, when a user moves the wireless power receiving device 200 to the third wireless charging table 215 and places the wireless power receiving device 200 close to or in contact with the third NFC tag 215a, the wireless power receiving device 200 may transmit, to the server 300, device information of the wireless power receiving device 200, communication establishment information of the wireless power receiving device 200, and location information in association with the third wireless charging table that is received from the third NFC tag 215a.

The server 300 may request the third wireless power transmitting device 105 to transmit wireless power to the wireless power receiving device 200, according to the received location information $(x_3, y_3, z_3)$ associated with the wireless charging area and the device information of the wireless power receiving device 200. The first wireless power transmitting device 100 continuously communicates with the wireless power receiving device 200 while transmitting wireless power to the wireless power receiving device 200, and may interrupt a wireless power transmission when it is determined that the wireless power receiving device 200 is no longer in proximity to receive power.

Also, the server 300 may receive information associated with an amount of wireless power that has been transmitted to the wireless power receiving device 200 and may determine an amount of wireless power that the third wireless power transmitting device 105 is to transmit to the wireless power receiving device 200. For example, when an amount of power to be supplied to the wireless power receiving device 200 is 3 KW and an amount of power that the first wireless power transmitting device 100 has transmitted to the wireless power receiving device 200 is 2 KW, the server 300 may determine that the third wireless power transmitting device 105 may only transmit 1 KW. The server 300 may transmit the information associated with the determined amount of power to the third wireless power transmitting device 105, so as to request the wireless power transmitting device 105 to transmit only the determined amount of power to the wireless power receiving device 200.

Figure 6:
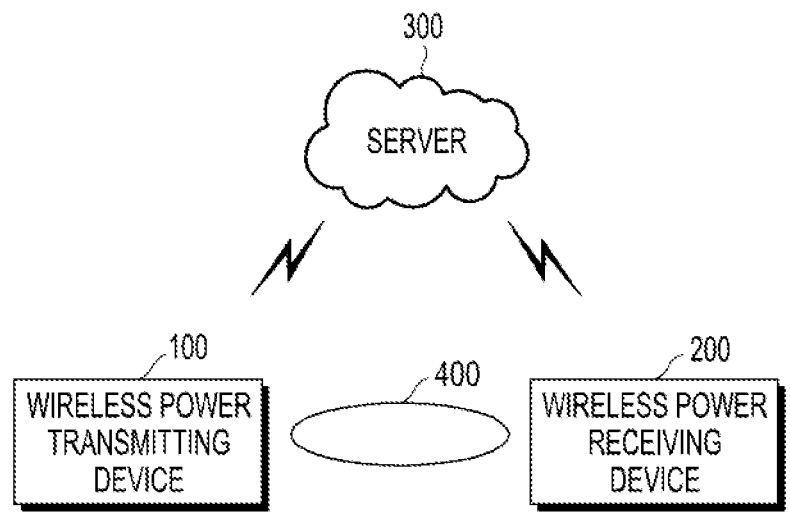
FIG. 6 is a diagram illustrating an example of a wireless charging system that uses a magnetic induction scheme according to an embodiment of the present disclosure.

FIG. 6 illustrates an example of a wireless charging system using a magnetic induction scheme according to an embodiment of the present disclosure.

Referring to FIG. 6, the wireless power transmitting device 100, the wireless power receiving device 200, and the server 300 are illustrated.

The wireless power transmitting device 100 may be provided in the form of, for example, a charging pad. When the wireless power receiving device 200 is put on the charging pad, the wireless power receiving device 200 may receive the wireless power 400 and may be charged. The distance between the wireless power transmitting device 100 and the wireless power receiving device 200 may be less than or equal to 1 cm.

The wireless power receiving device 200 may be charged by receiving the wireless power 400 from the wireless power transmitting device 100 and providing power to a load (e.g., a battery) that is electrically connected with the wireless power receiving device 200. Also, the wireless power receiving device 200 may transmit, to the wireless power transmitting device 100, a signal for requesting a wireless power transmission, information required for a wireless power reception, state information, control information for the wireless power transmitting device 100, payment information, and the like.

The wireless power receiving device 200 may transmit the information to the wireless power transmitting device 100 through an in-band communication scheme. For example, the wireless power receiving device 200 may transmit payment information of the wireless power receiving device 200, a signal for requesting a wireless power transmission, information required for a wireless power reception, state information, and control information for the wireless power transmitting device 100, to the wireless power transmitting device 100 using a change in a magnetic field of a coil that receives wireless power. Accordingly, a user may charge the wireless power receiving device 200 by the wireless power receiving device 200 on a charging pad without requiring a separate payment process. Also, an authentication procedure may be performed by transmitting the payment information from the wireless power receiving device 200 to the wireless power transmitting device 100, and thus, a separate authentication process may be omitted. Also, a pairing process may be omitted by using the in-band communication scheme.

For example, when a user executes a credit card application in the wireless power receiving device 200 and places the wireless power receiving device 200 on the charging pad, payment information (e.g., a credit card number) may be transmitted to the wireless power transmitting device 100 through a wireless charging coil, and the wireless power transmitting device 100 may transmit the received payment information to the server 300.

The wireless power receiving device 200 may transmit the payment information to the server 300 according to an out-band communication scheme with the server 300. After the server 300 determines an amount of wireless power that the wireless power transmitting device 100 is to transmit to the wireless power receiving device 200 based on the received payment information, the server 300 may transfer information associated with the determined amount of power to the wireless power transmitting device 100.

A credit card payment terminal (not illustrated) may be operable in conjunction with the wireless power transmitting device 100. When a user places the wireless power receiving device 200 on the charging pad of the wireless power transmitting device 100, a coil contained in the wireless power receiving device 200 may generate a magnetic field corresponding to information required for payment (e.g., a credit card number) according to a magnetic secure transmission (MST) communication scheme, and the credit card payment terminal may process the payment.

Figure 7:
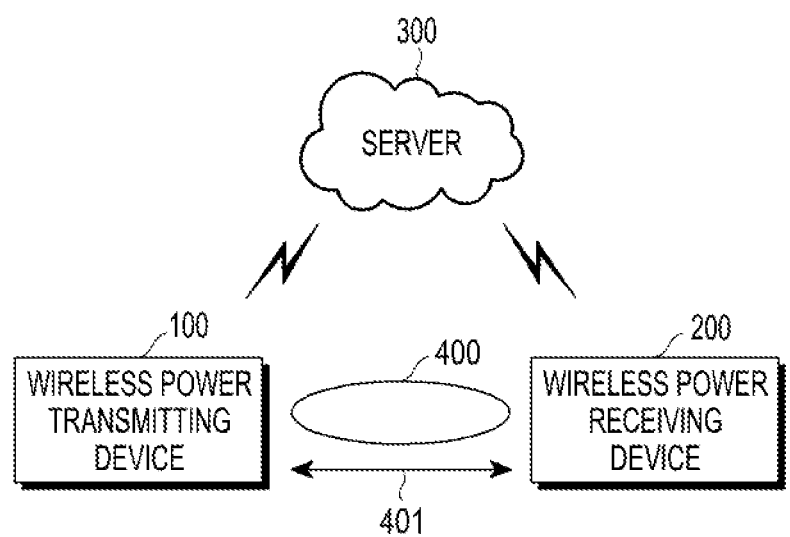
FIG. 7 is a diagram illustrating an example of a wireless charging system using a magnetic resonance scheme according to an embodiment of the present disclosure.

FIG. 7 is a diagram illustrating an example of a wireless charging system using a magnetic resonant scheme according to an embodiment of the present disclosure.

Referring to FIG. 7, the wireless power transmitting device 100, the wireless power receiving device 200, and the server 300 are illustrated.

The wireless power receiving device 200 may charge a battery by receiving the wireless power 400 from the wireless power transmitting device 100 and providing power to a load (e.g., a battery) that is electrically connected to the wireless power receiving device 200.

The wireless power receiving device 200 may transmit information required for receiving wireless power from the wireless power transmitting device 100, such as payment information, a signal for requesting a wireless power transmission, and state information of the wireless power receiving device 200, to the wireless power transmitting device 100 through a communication unit according to an out-band communication scheme 401. For example, the wireless power receiving device 200 may transmit the information using a short-range communication such as Bluetooth, Wi-Fi, or the like.

The wireless power transmitting device 100 may authenticate the wireless power receiving device 200 using the payment information and transmit wireless power to the wireless power receiving device 200. Also, the wireless power transmitting device 100 may transmit the received payment information to the server 300. The server 300 may process payment corresponding to an amount of wireless power transmitted to the wireless power receiving device 200. Also, the wireless power transmitting device 100 may receive state information of the wireless power receiving device 200 from the wireless power receiving device 200, and may interrupt a wireless power transmission based on the state information. For example, when the wireless power transmitting device 100 receives a charge complete signal from the wireless power receiving device 200, the wireless power transmitting device 100 interrupts a wireless power transmission based on the charge complete signal, and transmits, to the server 300, information associated with an amount of wireless power that the wireless power receiving device 200 receives from the wireless power transmitting device 100 or information associated with an amount of wireless power that the wireless power transmitting device 100 transmits to the wireless power receiving device 200. The server 300 may determine costs based on the received information associated with the amount of wireless power, and may process payment based on the determined costs.

A card payment terminal (not illustrated) may be disposed around the wireless power transmitting device 100. When a user places the wireless power receiving device 200 on a charging pad of the wireless power transmitting device 100, a coil contained in the wireless power receiving device 200 may generate a magnetic field corresponding to payment information (e.g., a card number) that is required for payment according to an MST scheme, and the card payment terminal may obtain payment information by receiving the magnetic field, and may transmit the obtained payment information to the server 300. The server 300 may process the payment using the card number.

Figure 8:
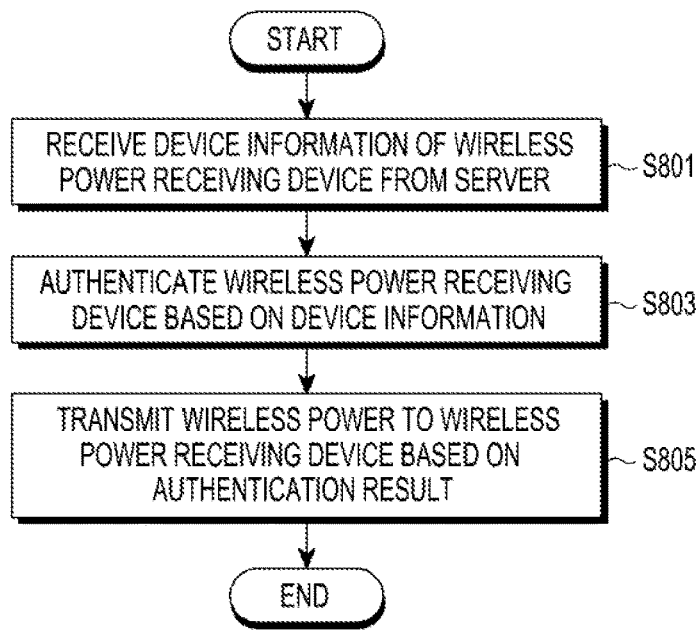
FIG. 8 is a flowchart illustrating a process in which a wireless power transmitting device transmits wireless power to a wireless power receiving device according to an embodiment of the present disclosure.

FIG. 8 is a flowchart illustrating a process in which a wireless power transmitting device transmits wireless power to a wireless power receiving device according to an embodiment of the present disclosure.

Referring to FIG. 8, a wireless power transmitting device receives device information of a wireless power receiving device from a server in operation S801. The wireless power transmitting device may transmit wireless power to the wireless power receiving device using at least one of an induction scheme, a resonant scheme, and an electromagnetic wave scheme. A server may receive the device information of the wireless power receiving device from the wireless power receiving device. The device information may be identifier information or a MAC address that is used for identifying a wireless power receiving device in a network. Also, the server may receive payment information for charging when the wireless power receiving device receives wireless power, and may include credit card information of a user.

The wireless power transmitting device authenticates the wireless power receiving device based on the device information in operation S803. The wireless power transmitting device receives device information from a wireless power receiving device. For ease of descriptions, device information that the wireless power transmitting device receives from the server is referred to as first device information. Device information that the wireless power transmitting device receives directly from the wireless power receiving device is referred to as second device information. When it is determined that first device information and second device information are identical, the wireless power transmitting device may authenticate a wireless power receiving device to receive wireless power.

The wireless power transmitting device may use an in-band communication scheme to receive device information from the wireless power receiving device. For example, when an induction scheme is implemented, the wireless power transmitting device may receive second device information from a wireless power receiving device using a change in a magnetic field of an inductive coil that transmits wireless power. When a wireless power transmitting device implements a resonant scheme or an electromagnetic wave scheme, the wireless power transmitting device may receive second device information from a wireless power receiving device using an out-band communication scheme. When a wireless power transmitting device implements a resonant scheme or an electromagnetic wave scheme, the wireless power transmitting device may receive second device information from a wireless power receiving device using short-range communication, for example, Bluetooth, Wi-Fi, and the like.

The wireless power transmitting device transmits wireless power to the wireless power receiving device based on an authentication result in operation S805. When the first device information and the second device information are identical, the wireless power transmitting device determines that authentication is successfully performed and transmits wireless power to the wireless power receiving device. In addition, the wireless power transmitting device may determine a scheme of transmitting wireless power. For example, the wireless power receiving device receives information associated with a wireless power transmission scheme that the wireless power receiving device supports and may determine a power transmission scheme. The wireless power transmitting device may wirelessly transmit power to the wireless power receiving device by using an element included in the wireless power transmitting device according to the determined power transmission scheme. For example, when the determined wireless power transmission scheme is a magnetic induction scheme, wireless power may be transmitted to the wireless power receiving device using an inductive coil. When the determined wireless power transmission scheme is a magnetic resonant scheme, wireless power may be transmitted to the wireless power receiving device using a resonator. When the determined wireless power transmission scheme is an electromagnetic wave scheme, wireless power may be transmitted to the wireless power receiving device using an array antenna.

Figure 9:
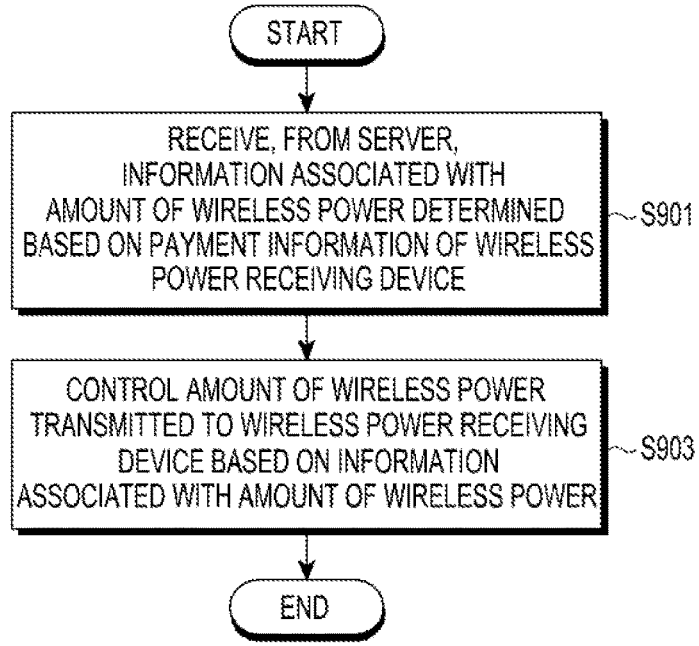
FIG. 9 is a flowchart illustrating a process in which a wireless power transmitting device controls an amount of wireless power transmitted to a wireless power receiving device according to an embodiment of the present disclosure.

FIG. 9 is a flowchart illustrating a process in which a wireless power transmitting device controls an amount of wireless power transmitted to a wireless power receiving device according to an embodiment of the present disclosure.

Referring to FIG. 9, a wireless power transmitting device receives, from a server, information associated with an amount of wireless power determined based on payment information of the wireless power receiving device in operation S901. The server may determine an amount of wireless power that the wireless power transmitting device is to transmit to the wireless power receiving device using payment information. For example, when a user of the wireless power receiving device pays an amount of payment, the server determines an amount of wireless power corresponding to the amount of payment. The server transmits the information associated with the determined amount of wireless power to the wireless power transmitting device.

The wireless power transmitting device controls an amount of wireless power transmitted to the wireless power receiving device based on the information received from the server in operation S903. When the wireless power transmitting device receives the information, the wireless power transmitting device may transmit power to the wireless power receiving device based on the information. The wireless power transmitting device continuously monitors an amount of wireless power transmitted and, when the amount of wireless power reaches a predetermined value, the wireless power transmitting device may interrupt transmission. For example, when an amount of wireless power corresponding to an amount of payment that the user pays is 3 KW, the wireless power transmitting device may only deliver 3 KW of power.

The wireless power transmitting device receives charge complete data from the wireless power receiving device, and transmits, to the server, information associated with an amount of wireless power transmitted to the wireless power receiving device. The server may process payment for the corresponding amount of wireless power. The process associated therewith will be described with reference to FIG. 10.

Figure 10:
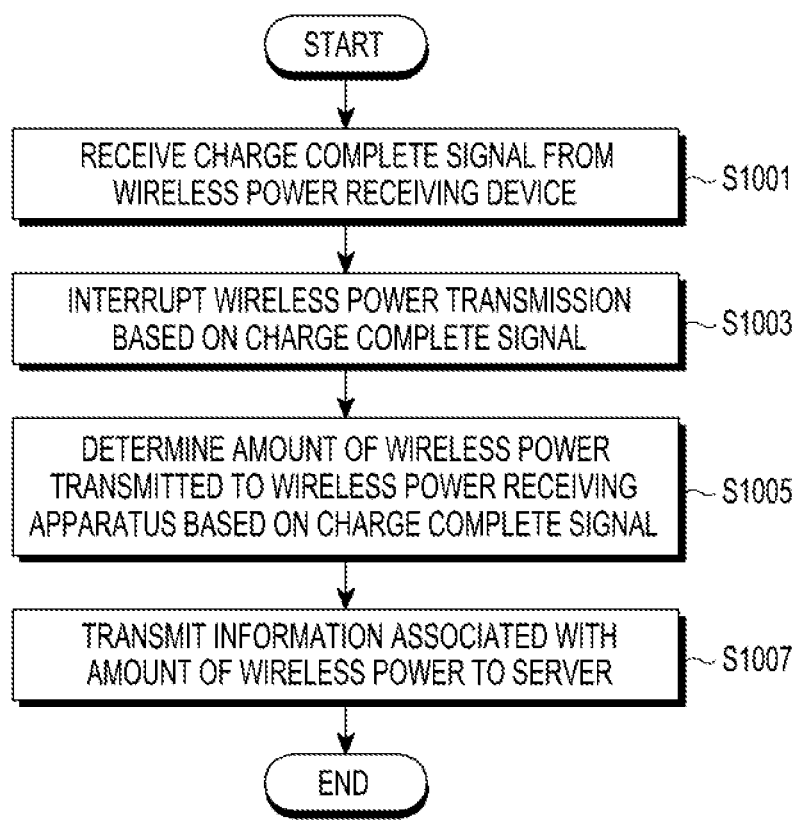
FIG. 10 is a flowchart illustrating a process in which a wireless power transmitting device transmits information associated with an amount of wireless power according to an embodiment of the present disclosure.

FIG. 10 is a flowchart illustrating a process in which a wireless power transmitting device transmits information associated with an amount of wireless power according to an embodiment of the present disclosure.

Referring to FIG. 10, a wireless power transmitting device receives a charge complete signal from a wireless power receiving device in operation S1001. The wireless power transmitting device may receive a charge complete signal from the wireless power receiving device based on an in-band communication scheme or an out-band communication scheme. The descriptions associated with in-band communication and out-band have been provided in the descriptions of FIG. 9. Herein, the descriptions thereof will be omitted.

When a battery included in the wireless power receiving device is completely charged or is charged up to a value set by a user, the wireless power receiving device transmits a charge complete signal to the wireless power transmitting device. Also, when the wireless power receiving device terminates a wireless power reception while the wireless power transmitting device transmits wireless power to the wireless power receiving device, the wireless power receiving device may transmit a charge complete signal to the wireless power transmitting device.

Also, when charging is interrupted by a user, a charge complete signal may be transmitted to the wireless power transmitting device. The wireless power transmitting device interrupts a wireless power transmission based on the charge complete signal in operation S1003. Optionally, when the wireless power transmitting device receives a charge complete signal from the wireless power receiving device, the wireless power transmitting device may transmit wireless power by reducing an intensity of the wireless power.

The wireless power transmitting device determines an amount of wireless power transmitted to the wireless power receiving device based on the charge complete signal in operation S1005. The wireless power transmitting device determines an amount of wireless power transmitted to the wireless power receiving device from a point when a wireless power transmission begins to a point when the charge complete signal is received.

The wireless power transmitting device transmits, to the server, information associated with an amount of wireless power transmitted to the wireless power receiving device in operation S1007. When the amount of power transmitted to the wireless power receiving device is determined, the wireless power transmitting device may transmit information associated with the amount of power to the server. The server may calculate a charge using the received information associated with the power.

Figure 11:
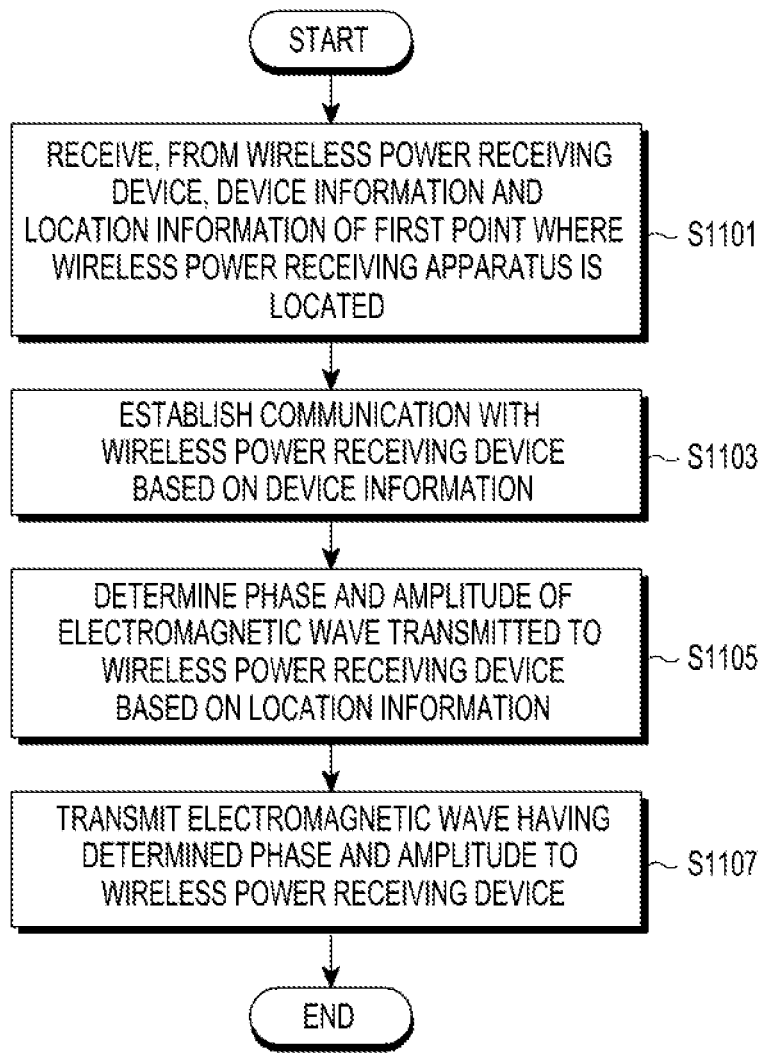
FIG. 11 is a flowchart illustrating a process in which a wireless power transmitting device transmits wireless power to a wireless power receiving device according to an embodiment of the present disclosure.

FIG. 11 is a flowchart illustrating a process in which a wireless power transmitting device transmits wireless power to a wireless power receiving device according to an embodiment of the present disclosure.

Referring to FIG. 11, a wireless power transmitting device receives, from the wireless power receiving device, device information of a wireless power receiving device and location information of a first point where the wireless power receiving device is located, in operation S1101. The wireless power transmitting device may transmit wireless power according to an electromagnetic wave scheme. The wireless power transmitting device may include a plurality of patch antennas to radiate wireless power, control power supplied to each patch antenna in order to control a phase and an amplitude of a sub-electromagnetic wave radiated from each patch antenna, and transmit wireless power to a desired location.

The wireless power transmitting device establishes communication with the wireless power receiving device based on the device information transferred from the wireless power receiving device in operation S1103. The device information may be information for identifying a wireless power receiving device in a network.

The wireless power transmitting device determines a phase and an amplitude of an electromagnetic wave transmitted to the wireless power receiving device based on the location information in operation S1105. When a user places the wireless power receiving device close to or into contact with an NFC tag attached to a wireless charging table, the wireless power receiving device may receive, from the NFC tag, location information of the wireless charging table and communication establishment information of a wireless power transmitting device required for a communication connection with the wireless power transmitting device, such as a MAC address of the wireless power transmitting device, which are stored in the NFC tag. The location of the wireless charging table may be the same as the location of the wireless power receiving device. The wireless power receiving device may establish communication with the wireless power transmitting device using the communication establishment information, which is obtained from the NFC tag, and may transmit, to the wireless power transmitting device, device information of the wireless power receiving device and location information of the first point where the wireless power receiving device is located. The first point may be a wireless charging area. Herein, the first point may be the same as the location of the table.

The wireless power transmitting device may determine a phase and an amplitude of an electromagnetic wave radiated from a patch antenna, based on the location information of the wireless charging table received from the wireless power receiving device.

The wireless power transmitting device transmits an electromagnetic wave having the determined phase and amplitude to the wireless power receiving device in operation S1107. To enable an electromagnetic wave to be transmitted to the first point, the wireless power transmitting device may control a phase or an amplitude of a sub-electromagnetic wave radiated from each patch antenna by controlling an amplitude and a phase of power input to each patch antenna.

Figure 12:
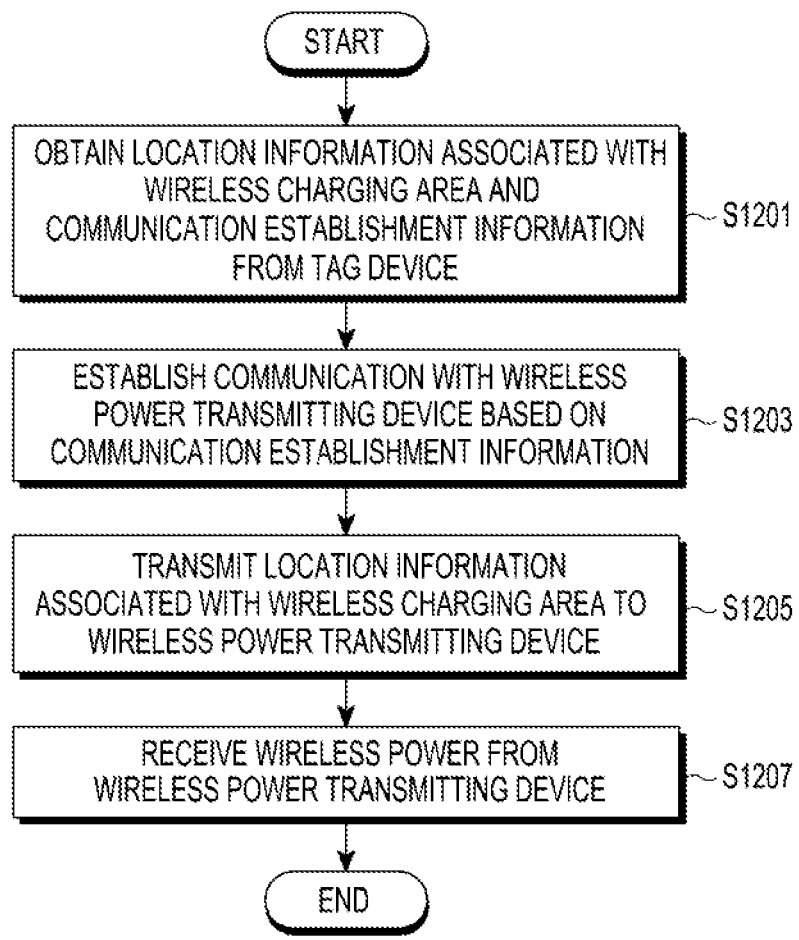
FIG. 12 is a flowchart illustrating a power receiving method of a wireless power receiving device according to an embodiment of the present disclosure.

FIG. 12 is a flowchart illustrating a power receiving method of a wireless power receiving device according to an embodiment of the present disclosure.

Referring to FIG. 12, a wireless power receiving device obtains communication establishment information and location information associated with a wireless charging area from a tag device in operation S1201. The tag device may include at least one of an NFC tag, an RFID tag, a QR code, a barcode, and an MST device, but may not be limited thereto. The tag device may include the location information and communication establishment information. The communication establishment information may include information for establishing communication with the wireless power transmitting device and/or server access information for accessing a server. When a user places the wireless power receiving device close to or into contact with the tag device, the wireless power receiving device may obtain communication establishment information and location information included in the tag device.

The wireless power receiving device may include a camera, and when the tag device is a QR code or a bar code, the wireless power receiving device may obtain location information and communication establishment information from the QR code or bar code using the camera.

The wireless power receiving device establishes communication with the wireless power transmitting device based on the communication establishment information in operation S1203. For example, the wireless power receiving device may establish communication with the wireless power transmitting device information included in the communication establishment information.

The wireless power receiving device transmits location information associated with a wireless charging area to the wireless power transmitting device in operation S1205. The location information may include an area within a predetermined distance from the tag device, and may include the location of the wireless power receiving device. Also, the location information may include index information indicating an area that is designated by a wireless charging system in advance to identify where an electronic device may be located to perform wireless charging.

The wireless power transmitting device receives the location information and may transmit wireless power to the wireless power receiving device based on the location information. Particularly, the wireless power transmitting device may transmit wireless power to the wireless power receiving device according to a wireless power transmission scheme supported by the wireless power receiving device using the location information. For example, when the wireless power receiving device supports a wireless power transmission scheme based on an electromagnetic wave scheme, the wireless power transmitting device may transmit power to the wireless power receiving device by controlling at least one of a phase and an amplitude of an electromagnetic wave radiated from each patch antenna, based on the information associated with the wireless charging area received from the wireless power receiving device. Also, when the wireless power receiving device supports a magnetic induction scheme or a magnetic resonant scheme, power is supplied to an inductive coil or a resonator included in the wireless power transmitting device, an intensity of a magnetic field generated from the inductive coil or the resonator is controlled, and power may be wirelessly transmitted to the wireless power receiving device.

The wireless power receiving device receives wireless power from the wireless power transmitting device in operation S1207. The wireless power receiving device charges a battery using the received wireless power and may transmit a charge complete signal to the wireless power transmitting device when the battery is completely charged.

The wireless power transmitting device receives the charge complete signal and controls transmission of wireless power based on the received charge complete signal. For instance, the wireless power transmitting device reduces an amount of wireless power transmitted to the wireless power receiving device or interrupts a wireless power transmission using the charge complete signal. Also, the wireless power receiving device may access the server using the communication establishment information obtained from the tag device, and may transmit payment information to the server. The payment information may be used for payment of wireless charging and may include an amount of payment and/or credit card information. Optionally, the wireless power receiving device may transmit the payment information to the wireless power transmitting device. In this instance, the wireless power transmitting device may proceed with payment in association with power transmitted to the wireless power receiving device using the payment information received from the wireless power receiving device.

Figure 13:
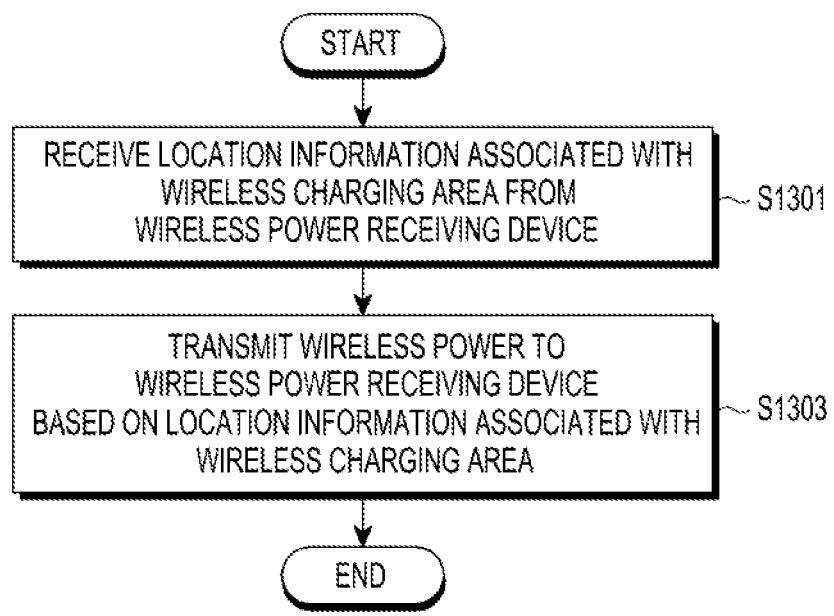
FIG. 13 is a flowchart illustrating a wireless power transmitting method of a wireless power transmitting device according to an embodiment of the present disclosure.

FIG. 13 is a flowchart illustrating a wireless power transmitting method of a wireless power transmitting device according to an embodiment of the present disclosure.

Referring to FIG. 13, a wireless power transmitting device receives location information associated with a wireless charging area from a wireless power receiving device in operation S1301. The location information may include an area within a predetermined distance from the tag device and may include the location of the wireless power receiving device. Also, the location information may include index information indicating an area that is designated by a wireless charging system in advance for where an electronic device may be located to perform wireless charging.

The wireless power transmitting device transmits wireless power to the wireless power receiving device based on the location information in operation S1303. The wireless power transmitting device may receive the location information and may transmit wireless power to the wireless power receiving device according to a wireless power transmission scheme supported by the wireless power receiving device based on the location information. For example, when the wireless power receiving device supports an electromagnetic wave-based wireless power transmission scheme, the wireless power transmitting device may control at least one of a phase and an amplitude of an electromagnetic wave corresponding to wireless power, using the location information. Also, when the wireless power receiving device supports a magnetic induction scheme or a magnetic resonant scheme, power may be supplied to an inductive coil or a resonator included in the wireless power transmitting device, an intensity of a magnetic field generated from the inductive coil or the resonator may be controlled, and power may be wirelessly transmitted to the wireless power receiving device.

The wireless power transmitting device may receive a charge complete signal from the wireless power receiving device and may control wireless power transmission based on the charge complete signal. For instance, when the wireless power transmitting device receives the charge complete signal, the wireless power transmitting device may reduce wireless power transmission or may interrupt wireless power transmission.

The wireless power transmitting device may receive payment information from the wireless power receiving device, and may begin a wireless power transmission to the wireless power receiving device based on the payment information. The payment information may include an amount of payment, and the wireless power transmitting device may determine an amount of wireless power to be transmitted to the wireless power receiving device based on the amount of payment. That is, the wireless power transmitting device may determine an amount of wireless power corresponding to the amount of payment and transmit the determined amount of wireless power to the wireless power receiving device.

Also, the payment information may include credit card information, and the wireless power transmitting device may begin a wireless power transmission to the wireless power receiving device based on the credit card information.

Figure 14:
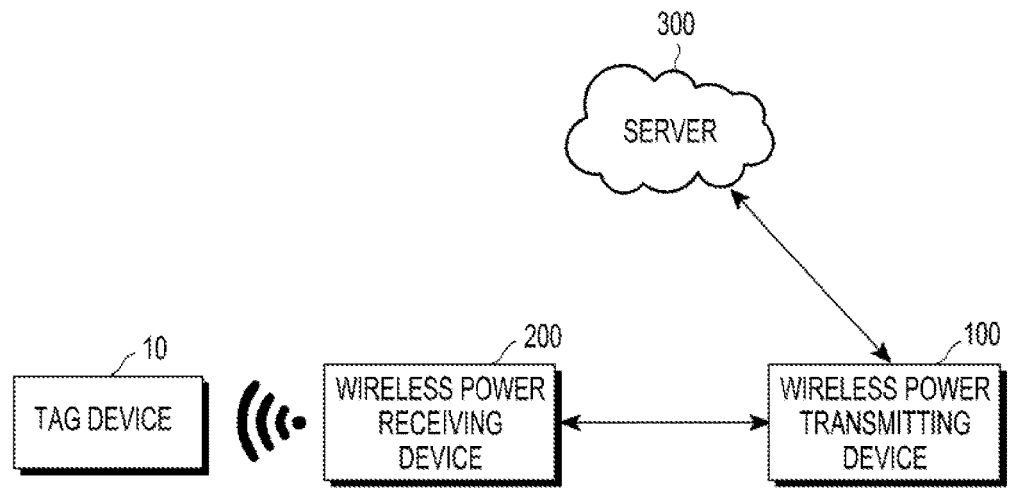
FIG. 14 is a diagram illustrating an example in which a wireless power transmitting device receives payment information from a wireless power receiving device according to an embodiment of the present disclosure.

FIG. 14 is a diagram illustrating an example in which a wireless power transmitting device receives payment information from a wireless power receiving device according to an embodiment of the present disclosure.

Referring to FIG. 14, the tag device 10, the wireless power receiving device 200, the wireless power transmitting device 100, and the server 300 are illustrated.

The tag device 10 may include location information associated with a wireless charging area and communication establishment information. The communication establishment information may include information for establishing communication with the wireless power transmitting device 100 and server access information for accessing the server 300.

The tag device 10 may include, for example, an NFC tag, an RFID tag, a QR code, a bar code, and an MST device. The wireless power receiving device 200 may obtain communication establishment information and location information associated with a wireless charging area from the tag device 10.

The wireless power receiving device 200 may establish communication with the wireless power transmitting device 100 using communication establishment information, and may transmit location information associated with a wireless charging area, payment information, device information of the wireless power receiving device 200, and user information of the wireless power receiving device 200, which are obtained from a tag device, to the wireless power transmitting device 100. The payment information may include an amount of payment and/or credit card information.

The wireless power transmitting device 100 may transmit wireless power according to a wireless power transmission scheme supported by the wireless power receiving device using the location information. For example, when the wireless power receiving device supports an electromagnetic wave-based wireless power transmission scheme, the wireless power transmitting device controls a phase and a size of an electromagnetic wave corresponding to wireless power and transmits the wireless power to the wireless power receiving device 200. Also, when the wireless power receiving device supports a magnetic induction scheme or a magnetic resonant scheme, power is supplied to an inductive coil or a resonator included in the wireless power transmitting device, an intensity of a magnetic field generated from the inductive coil or the resonator is controlled, and power may be wirelessly transmitted to the wireless power receiving device.

The wireless power transmitting device 100 may determine an amount of wireless power to be transmitted to the wireless power transmitting device according to the amount of payment and transmit wireless power corresponding to the determined amount of wireless power to the wireless power receiving device.

The wireless power transmitting device 100 may include a payment function. When the wireless power transmitting device 100 receives only credit card information without information associated with an amount of payment, the wireless power transmitting device 100 transmits wireless power to the wireless power receiving device 200, interrupts a wireless power transmission or reduces an intensity of a wireless power in response to receiving a charge complete signal from the wireless power receiving device 200, determines an amount of payment by calculating an amount of wireless power transmitted to the wireless power receiving device 200, and processes the payment.

The wireless power transmitting device 100 transmits the amount of payment and the credit card information to the server 300, and the server 300 proceeds with payment based on the amount of payment and the credit card information.

Figure 15:
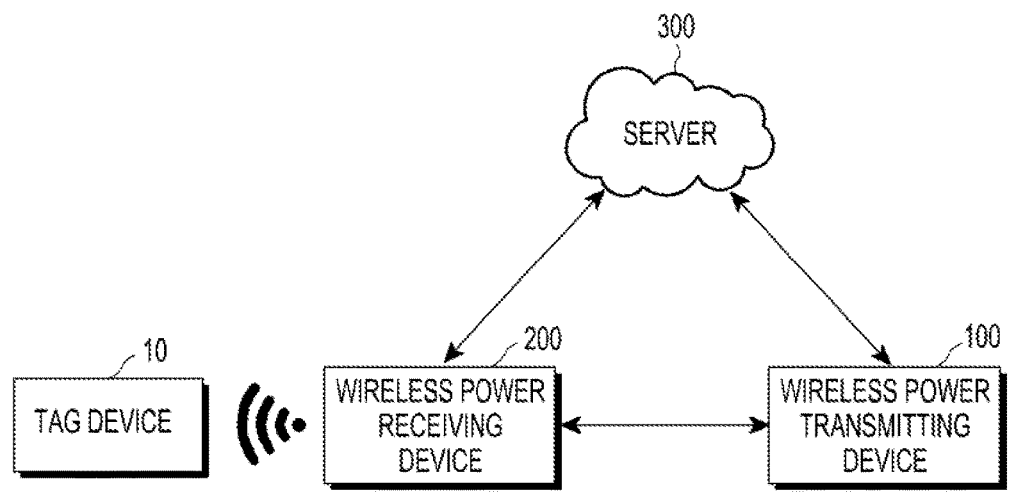
FIG. 15 is a diagram illustrating an example in which a server receives payment information from a wireless power receiving device according to an embodiment of the present disclosure.

FIG. 15 is a diagram illustrating an example in which a server receives payment information from a wireless power receiving device according to an embodiment of the present disclosure.

Referring to FIG. 15, the tag device 10, the wireless power receiving device 200, the wireless power transmitting device 100, and the server 300 are illustrated.

The tag device 10 may include location information associated with a wireless charging area and communication establishment information. The communication establishment information may include communication establishment information for establishing communication with the wireless power transmitting device 100 and server access information for accessing the server 300.

The tag device 10 may include, for example, an NFC tag, an RFID tag, a QR code, a bar code, and an MST device. The wireless power receiving device 200 may obtain communication establishment information and location information from the tag device 10.

The wireless power receiving device 200 may establish communication with the wireless power transmitting device using the communication establishment information, and may transmit, to the wireless power transmitting device 100, the location information and the device information of the wireless power receiving device 200, which are obtained from the tag device 10.

The wireless power transmitting device 100 may transmit wireless power according to a wireless power transmission scheme supported by the wireless power receiving device using the location information. For example, when the wireless power receiving device supports an electromagnetic wave-based wireless power transmission, the wireless power transmitting device may control a magnitude and a phase of power input to each patch antenna included in an array antenna to control a phase and an amplitude of an electromagnetic wave corresponding to wireless power and transmit wireless power to the wireless power receiving device 200. Also, when the wireless power receiving device supports a magnetic induction scheme or a magnetic resonant scheme, power is supplied to an inductive coil or a resonator included in the wireless power transmitting device, an intensity of a magnetic field generated from the inductive coil or the resonator is controlled, and power may be wirelessly transmitted to the wireless power receiving device.

The wireless power receiving device 200 may access the server 300 using server access information included in the communication establishment information, and may transmit payment information for charging for wireless charging, device information of the wireless power receiving device 200, and user information of the wireless power receiving device 200 to the server 300. The payment information may include, for example, an amount of payment and credit card information. The server 300 may transmit, to the wireless power transmitting device 100, the device information of the wireless power receiving device 200 or the user information of the wireless power receiving device 200. The wireless power transmitting device 100 may authenticate the wireless power receiving device 200 based on the received information, and may begin a wireless power transmission.

The server 300 may determine an amount of wireless power to be transmitted to the wireless power receiving device 200 according to an amount of payment and transmit wireless power to the wireless power transmitting device 100. The wireless power transmitting device 100 may transmit wireless power corresponding to the amount of wireless power that is received from the server 300.

When the wireless power transmitting device 100 transmits wireless power to the wireless power receiving device 200 and receives a charge complete signal from the wireless power receiving device 200, the wireless power transmitting device 100 interrupts a wireless power transmission or reduces an intensity of wireless power, calculates an amount of wireless power transmitted to the wireless power receiving device 200, and transmits the same to the server 300. The server 300 processes the payment based on payment information and information associated with the amount of wireless power received from the wireless power transmitting device 100.

Figure 16:
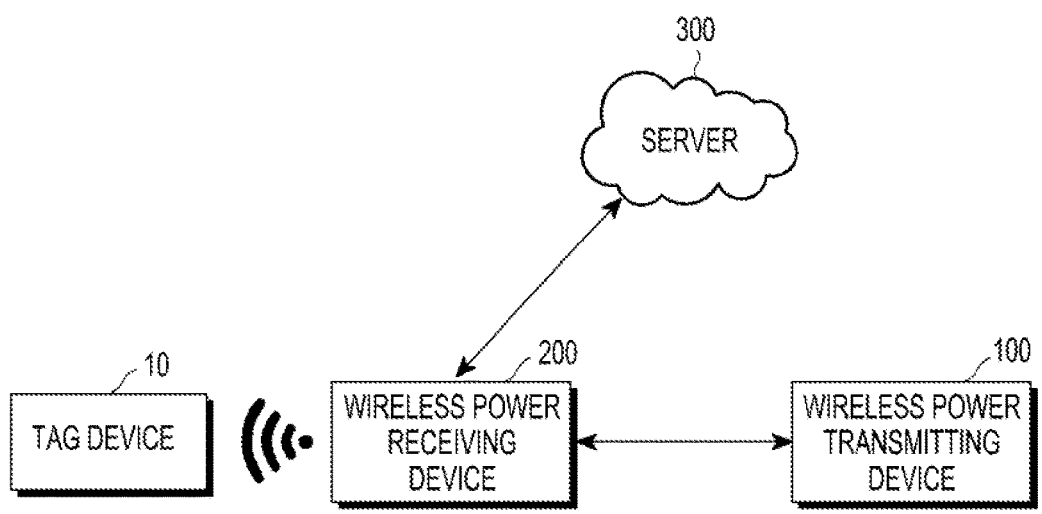
FIG. 16 is a diagram illustrating an example in which a wireless power transmitting device and a server proceed with payment using information associated with an amount of wireless power, which is received from a wireless power receiving device, according to an embodiment of the present disclosure.

FIG. 16 is a diagram illustrating an example in which a wireless power transmitting device and a server proceed with payment using information associated with an amount of wireless power received from a wireless power receiving device according to an embodiment of the present disclosure.

Referring to FIG. 16, the tag device 10, the wireless power receiving device 200, the wireless power transmitting device 100, and the server 300 are illustrated.

The tag device 10 may include location information associated with a wireless charging area and communication establishment information. The communication establishment information may include communication establishment information for establishing communication with the wireless power transmitting device 100 and server access information for accessing the server 300.

The tag device 10 may include, for example, an NFC tag, an RFID tag, a QR code, a bar code, and an MST device. The wireless power receiving device 200 may obtain location information associated with a wireless charging area and communication establishment information from the tag device 10.

The wireless power receiving device 200 establishes communication with the wireless power transmitting device 100 using the communication establishment information and transmits, to the wireless power transmitting device 100, the location information, device information of the wireless power receiving device 200, and user information of the wireless power receiving device 200.

The wireless power transmitting device 100 may transmit wireless power according to a wireless power transmission scheme supported by the wireless power receiving device using the location information. For example, when the wireless power receiving device supports an electromagnetic wave-based wireless power transmission scheme, the wireless power transmitting device may control a magnitude and a phase of power input to each patch antenna included in an array antenna in order to control a phase and a magnitude of an electromagnetic wave corresponding to wireless power and transmit wireless power to the wireless power receiving device 200. Also, when the wireless power receiving device supports a magnetic induction scheme or a magnetic resonant scheme, power is supplied to an inductive coil or a resonator included in the wireless power transmitting device, an intensity of a magnetic field generated from the inductive coil or the resonator is controlled, and power may be wirelessly transmitted to the wireless power receiving device.

The wireless power receiving device 200 may access the server 300 using server access information included in the communication establishment information, and may transmit, to the server 300, payment information. In addition, the wireless power receiving device 200 may transmit device information of the wireless power receiving device 200 and user information of the wireless power receiving device 200 to the server 300, for the purpose of authentication or the like. For example, the server 300 may transmit, to the wireless power transmitting device 100, the device information and the user information of the wireless power receiving device 200. The wireless power transmitting device 100 may compare the same with device information and user information from the wireless power receiving device 200, authenticate the wireless power receiving device 200, and begin wireless power transmission.

When a battery (not illustrated) of the wireless power receiving device 200 is fully charged or is charged up to a predefined level, the wireless power receiving device 200 may transmit a charge complete signal to the wireless power transmitting device 100 to complete charging and transmit information associated with an amount of received wireless power to the server 300. The server 300 may proceed with payment based on payment information previously obtained from the wireless power receiving device 200 and information associated with an amount of wireless power that is received from the wireless power receiving device 200.

When charging is completed, the wireless power receiving device 200 may transmit a charge complete signal to the wireless power transmitting device 100 to complete charging and transmit information associated with an amount of received wireless power to the wireless power transmitting device 100.

The wireless power transmitting device 100 processes the payment based on the information associated with the amount of received wireless power. Alternatively, the wireless power transmitting device 100 may transmit payment information and information associated with an amount of wireless power to the server 300, and the server 300 processes the payment based on the payment information and the information associated with the amount of wireless power.

The methods according to the exemplary embodiments of the present disclosure may be in a form of program commands executed through various computer means to be recorded in a computer readable medium. The computer readable medium may include a program command, a data file, a data structure, and the like independently or in combination. The computer readable medium may be stored, for example, in a volatile or non-volatile storage device such as a read only memory (ROM), a memory such as a random access memory (RAM), a memory chip, a memory device, or a memory IC, or a storage medium that is optically or magnetically recordable and simultaneously machine (for example, a computer)-readable, such as a compact disc (CD), a DVD, a magnetic disk, or a magnetic tape, regardless of its ability to be erased or re-recorded. The memory included in the mobile terminal may store a program or programs including instructions by which the embodiments of the present disclosure are realized.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wireless power receiving device for receiving power, the wireless power receiving device comprising:
   a communication circuit configured to perform communication using a first communication scheme and a second communication scheme;
   a power receiver; and
   a processor configured to:

obtain, through the first communication scheme, communication establishment information regarding a wireless power transmitting device and location information associated with a location of a first device external to the wireless power receiving device and the wireless power transmitting device from the first device, establish, through the second communication scheme, communication with the wireless power transmitting device by using the communication establishment information, transmit, through the second communication scheme, the location information associated with the location of the first device to the wireless power transmitting device based on the established communication, and control to receive, through the power receiver, power from the wireless power transmitting device, wherein the power is transmitted by the wireless power transmitting device based on the location information associated with the location of the first device.

2. The wireless power receiving device of claim 1, wherein the first communication scheme comprises at least one of a near field communication (NFC) or a radio frequency identifier (RFID) communication, and wherein the second communication scheme comprises at least one of Wi-Fi, Bluetooth low energy (BLE), and long term evolution (LTE).

3. The wireless power receiving device of claim 1, wherein the processor is further configured to:
charge a battery using the power, and
transmit, through the second communication scheme, a charge complete signal to the wireless power transmitting device when the battery is completely charged.

4. The wireless power receiving device of claim 1, wherein the processor is further configured to:
control to access, through the second communication scheme, a server using the communication establishment information, and
control to transmit, through the second communication scheme, payment information to the server.

5. A wireless power transmitting device for transmitting a power, the device comprising:
a communication circuit;
a power transmitter comprising a coil, a resonator, and an antenna; and
a processor configured to:
receive, through the communication circuit, information associated with a communication scheme of a wireless power receiving device and location information associated with a location of a first device external to the wireless power receiving device from the wireless power receiving device,
identify one among the coil, the resonator, and the antenna of the power transmitter based on the communication scheme of the wireless power receiving device, and
control to transmit, through the identified one among the coil, the resonator, and the antenna of the power transmitter, the power wirelessly based on the location information associated with the location of the first device.

6. The wireless power transmitting device of claim 5, wherein the processor is further configured to control at least one of a phase or an amplitude of an electromagnetic wave corresponding to the power based on the location information.

7. The wireless power transmitting device of claim 5, wherein the processor is further configured to:
receive, through the communication circuit, a charge complete signal from the wireless power receiving device, and
control transmission of the power based on the charge complete signal.

8. The wireless power transmitting device of claim 5, wherein the processor is further configured to:
receive, through the communication circuit, payment information from the wireless power receiving device, and
control to wirelessly transmit power to the wireless power receiving device based on the payment information.

9. The wireless power transmitting device of claim 8, wherein the processor is further configured to determine an amount of power to be transmitted to the wireless power receiving device based on an amount of payment included in the payment information.

10. The wireless power transmitting device of claim 8, wherein the processor is further configured to, when the payment information includes credit card information, start a wireless power transmission to the wireless power receiving device.

11. A wireless power receiving method of a wireless power receiving device, the method comprising:
obtaining, through a first communication scheme, communication establishment information regarding a wireless power transmitting device and location information associated with a location of a first device external to the wireless power receiving device and the wireless power transmitting device from the first device;
establishing, through a second communication scheme, communication with the wireless power transmitting device by using the communication establishment information;
transmitting, through the second communication scheme, the location information associated with the location of the first device to the wireless power transmitting device based on the established communication; and
wirelessly receiving power from the wireless power transmitting device,
wherein the power is transmitted by the wireless power transmitting device based on the location information associated with the location of the first device.

12. The wireless power receiving method of claim 11, wherein the wireless power receiving device communicates with the first device external to the wireless power receiving device using a first communication scheme comprising at least one of a near field communication (NFC) or a radio frequency identifier (RFID) communication, and
wherein the wireless power receiving device communicates with the wireless power transmitting device using a second communication scheme comprising at least one of Wi-Fi, Bluetooth low energy (BLE), or long term evolution (LTE).

13. The wireless power receiving method of claim 11, further comprising:
charging a battery of the wireless power receiving device using the power; and
transmitting a charge complete signal to the wireless power transmitting device when the battery is completely charged.

14. The wireless power receiving method of claim 11, further comprising:

accessing a server using the communication establishment information; and transmitting payment information of the wireless power receiving device to the server.

15. A wireless power transmitting method of a wireless power transmitting device, the method comprising:

receiving information associated with a communication scheme of a wireless power receiving device and location information associated with a location of a first device external to the wireless power receiving device from the wireless power receiving device;

identifying one among a coil, a resonator, and an antenna of a power transmitter based on the communication scheme of the wireless power receiving device; and wirelessly transmitting, through the identified one among the coil, the resonator, and the antenna of the power transmitter, power to the wireless power receiving device based on the location information associated with the location of the first device.

16. The method of claim 15, wherein the transmitting of the wireless power further comprises:

controlling at least one of a phase and an amplitude of an electromagnetic wave corresponding to the power based on the location information.

17. The method of claim 15, further comprising:

receiving a charge complete signal from the wireless power receiving device; and controlling transmission of the power based on the charge complete signal.

18. The method of claim 15, further comprising:

receiving payment information from the wireless power receiving device; and wirelessly transmitting power to the wireless power receiving device based on the payment information.

19. The method of claim 18, further comprising determining an amount of power to be transmitted to the wireless power receiving device based on an amount of payment included in the payment information.

20. The method of claim 18, further comprising, when the payment information includes credit card information, starting a wireless power transmission to the wireless power receiving device based on the credit card information.

\* \* \* \* \*